United States Patent
Perugini et al.

(10) Patent No.: US 12,212,845 B2
(45) Date of Patent: Jan. 28, 2025

(54) PASSIVE AUTOFOCUS SYSTEMS, ARTICLES AND METHODS

(71) Applicant: Datalogic IP Tech, S.r.l., Bologna (IT)

(72) Inventors: Luca Perugini, Bologna (IT); Simone Spolzino, Bologna (IT)

(73) Assignee: Datalogic IP Tech, S.r.l., Bologna (IT)

( * ) Notice: Subject to any disclaimer, the term of this patent is extended or adjusted under 35 U.S.C. 154(b) by 25 days.

(21) Appl. No.: 17/903,826

(22) Filed: Sep. 6, 2022

(65) Prior Publication Data

US 2024/0080557 A1 Mar. 7, 2024

(51) Int. Cl.
*H04N 23/67* (2023.01)
*G06T 7/13* (2017.01)

(52) U.S. Cl.
CPC ............. *H04N 23/671* (2023.01); *G06T 7/13* (2017.01)

(58) Field of Classification Search
CPC .............. G03B 13/36; G06K 7/10712; G06K 7/10811; G06T 7/13; H04N 23/56; H04N 23/67; H04N 23/671; H04N 23/74; H04N 25/707
See application file for complete search history.

(56) References Cited

U.S. PATENT DOCUMENTS

| | | | |
|---|---|---|---|
| 8,985,462 B2 | 3/2015 | Goren | |
| 9,800,749 B1 | 10/2017 | Tan et al. | |
| 11,974,055 B1* | 4/2024 | Smits | G06T 7/62 |
| 2009/0206158 A1* | 8/2009 | Thuries | H04N 23/67 |
| | | | 235/454 |
| 2014/0166758 A1* | 6/2014 | Goren | G06K 7/10801 |
| | | | 235/462.21 |
| 2021/0120186 A1 | 4/2021 | Mitani | |
| 2022/0187459 A1 | 6/2022 | Perugini et al. | |
| 2022/0207353 A1 | 6/2022 | Barr et al. | |

* cited by examiner

*Primary Examiner* — Antoinette T Spinks
(74) *Attorney, Agent, or Firm* — Cozen O'Connor

(57) ABSTRACT

Passive autofocusing is used in image acquisition devices (e.g., machine-readable symbol readers, cameras), and can be employed with shutter and/or event-based image sensors. An aimer pointer is easily detected in images, and one or more characteristics characterized at various focus positions of the optics. A size of a characteristic dimension and/or shape of the aimer pointer and/or a measure of sharpness of the aimer pointer is used to determine which image, and hence focus position, results in an optimized or even optimum (i.e., best) focus. The image acquisition system is then configured accordingly. Measuring aimer pointer size is typically less computationally intensive than conventional approaches. Use of a laser beam to produce the aimer pointer usually requires lower exposure time than other approaches. Image data can advantageously be windowed using a relatively small region of interest (ROI) based on a known aimer pointer position.

20 Claims, 10 Drawing Sheets

PASSIVE AUTOFOCUS SYSTEMS, ARTICLES AND METHODS

BACKGROUND

Technical Field

The present disclosure generally relates to autofocusing, for example autofocusing used in image acquisition devices (e.g., machine-readable symbol readers, cameras), and in particular relates to passive autofocusing employing an aimer pointer, and which can be used with shutter image sensors or event-based image sensors.

Description of the Related Art

There are a large variety of image acquisition devices available. Examples of image acquisition devices include, but are not limited to: readers, cameras, scanners, and even the ubiquitous mobile or cellular smartphone. Such image acquisition devices generally include one or more image sensors and associated optics.

One particular type of reader is a machine-readable symbol reader used to optically read machine-readable symbols that encode information. Machine-readable symbols take a variety of forms, the most commonly recognized form being the linear or one-dimensional machine-readable symbol typically referred to as a barcode symbol. Other forms include two-dimensional machine-readable symbols such as stacked code symbols, area or matrix code symbols, or QR code symbols. Machine-readable symbols may also include human-readable symbols (e.g., alpha, numeric, punctuation).

Machine-readable symbols have widespread and varied applications. For example, machine-readable symbols can be used to identify a class of objects (e.g., merchandise) or unique objects (e.g., patents). As a result, machine-readable symbols are found associated with a wide variety of objects, such as retail goods, company assets, packages, parcels, and documents, and help track production at manufacturing facilities and inventory at stores (e.g., by scanning objects as they arrive and as they are sold). In addition, machine-readable symbols may appear on a display of a portable electronic device, such as a cellular smartphone, tablet computer, laptop computer, or other device having an electronic display. For example, a customer, such as a shopper, airline passenger, or person attending a sporting event or theater event, may cause a machine-readable symbol to be displayed on their portable electronic device so that an employee (e.g., merchant-employee) can read the machine-readable symbol via a machine-readable symbol reader to allow the customer to redeem a coupon or to verify that the customer has purchased a ticket for the event, or board a vehicle.

One commonly used machine-readable symbol reader is an imager- or imaging-based machine-readable symbol reader. Imaging-based machine-readable symbol readers typically employ flood illumination to simultaneously illuminate the entire machine-readable symbol, either from dedicated light sources, or in some instances using ambient light. Such is in contrast to scanning or laser-based (i.e., flying spot) type machine-readable symbol readers, which scan a relative narrow beam or spot of light (e.g., laser light) sequentially across the machine-readable symbol.

Image acquisition devices may be fixed, for example, machine-readable symbol readers can be fixed into a structure at supermarket checkout stands or other point of sale locations. Machine-readable symbol readers may also be handheld (e.g., handheld readers or even smartphones), or may even be mobile (e.g., mounted on a vehicle such as a lift vehicle or a forklift).

Whether fixed, handheld or mobile, a field of view of an image acquisition device (e.g., machine-readable symbol reader, camera) is typically aimed at a target or a target is moved into the field of view of the image acquisition device.

To facilitate aiming, some image acquisition devices (e.g., machine-readable symbol readers) include an aimer subsystem which provides an aiming beam (e.g., laser light beam), and which aids the operator in positioning and/or orienting a field of view of the image acquisition device with respect to a target (e.g., machine-readable symbol) by displaying on a surface of the target object a visual indication, referred to as an aimer pointer. Aimer pointers can take a large variety of forms, from a simple spot of light to a more complex geometric pattern that, for instance, frames the region encompassed by the field of view of the image acquisition device. Some image acquisition devices (e.g., machine-readable symbol readers) may also include an active range finder to measure or estimate a reading distance, namely the distance between an image sensor of the image acquisition device and the target object.

The measurement or estimate of the distance may be used by the machine-readable symbol reader to activate a decoding algorithm only when the target object is located at a distance comprised between a minimum and maximum working distance, and/or to control a zoom device and/or a device to automatically change the focusing distance or focal point or focus of the machine-readable symbol reader. Moreover, the measurement or estimate of the distance can be used in the case in which digital restoration of the image is necessary, since a degrading function, or PSF (point spread function) of the optics of the image forming device may depend upon the reading distance. Furthermore, the measurement or estimate of the distance may be used to calculate a volume of an object, if such functionality is implemented in a particular machine-readable symbol reader.

Where a distance between a target to be imaged and an image acquisition device (e.g., machine-readable symbol reader, camera) may vary, a focus or focus point or focus distance of the image acquisition device may be adjusted to ensure that the target is correctly focused on the image sensor of the image acquisition device.

In autofocus systems, it is important to have methods to focus the optics at the correct distance in an efficient and reliable way. Autofocus techniques are divided in two main categories: active and passive. Conventional passive autofocus makes a complete focus sweep, evaluating image contrast and deciding which focus position is the best one to use. Passive autofocus is a closed loop approach that is reliable but slow. Active autofocus is typically based on additional signals generated from a source that is not part of the receiving system (e.g., an additional source such as time of flight sensors, laser triangulation from an external laser diode, phase shift, ultrasound wave measuring a delay between emission and reception). The additional signals provide a measure (e.g., turn-around delay, phase shift, dot displacement inside the received image) that can be directly related to a distance to a target (i.e., target distance) and therefore to the correct focus position. Active autofocus is an open loop system that is fast, but its reliability is dependent on the sensor accuracy. If for any reason, the active autofocus system feed forward signal is not accurate enough to model a relationship between distance and lens focus, a closed loop approach becomes preferred in order to determine the best focus position.

U.S. Pat. No. 9,800,749 B1 describes an approach that employs laser triangulation of two images, where an aimer is activated in one image and deactivated in the other image. A localization phase is based on combining the two images so to identify the aimer, which changes intensity from the first image to the second, and where a background is eliminated because the background does not change.

With the frame-based method, which is commonly used in global/rolling shutter image sensors, the pixels are exposed to light during determined time windows, and entire image is output as the intensity value of all image pixels, at intervals determined by the frame rate during the readout phase.

In contrast, event-based image sensors utilize an event-based approach that asynchronously detects pixel luminance changes and outputs data with pixel position (e.g., XY coordinates) and time information. To do so, each pixel is equipped with a signal processing circuit for detecting luminance changes. This design makes it possible that the output data only represents those pixels that have a detected change in luminance for the target object. This advantageously allows an event-based image sensor to immediately detect the luminance changes with high-speed, low-latency, high-temporal-resolution. Typically, the reconstructed image or more precisely image information coming from such event-based image sensors will output the edge of a moving object and output the objects or portions thereof that have a change in the amount of light that it reflects. The event-based image sensors typically output only a sign of the change (e.g., positive change or negative change), not the intensity of the variation. However, there are thresholds and parameters that can be set so to regulate which pixel will fire its event in response to a specified condition (e.g., intensity change trigger threshold).

BRIEF SUMMARY

In systems where an aimer is present, classic passive contrast based focus can be replaced or assisted by checking a size of a characteristic dimension (e.g., diameter, perimeter, area, diagonal, length of major axis, length of minor axis, ratio of length of major axis to length of minor axis, diagonal axis) of an aimer pointer (e.g., laser spot aimer pointer or two-dimensional pattern) while performing a focus sweep of the optics. Best focus is achieved when, during the lens sweep, the aimer pointer captured by the image sensor has a smallest dimension in the corresponding image or image information.

In the case of an event-based image sensor, detection of optimized or even optimal focus is made very efficient, fast and computationally simple, since the shrinking of a size of a characteristic dimension (e.g., diameter, perimeter, area, diagonal, length of major axis, length of minor axis, ratio of length of major axis to length of minor axis, diagonal axis) of an aimer pointer is very well highlighted by the typical output of such event-based image sensors.

The systems, articles and methods described herein can advantageously improve reliability, for example when a laser triangulation is present and it is not possible to accurately model a distance to lens focus relationship due to various effects, such as lens aging, creep, variations with temperature, etc.

The systems, articles and methods described herein are also useful in general for a passive autofocus system, for instance where an aimer subsystem is present along with a fast-focusing optics system. In example, a tunable MEMS lens are very fast to reach focus, but the voltage required for a specific diopter power depends on various effects, such as creep and temperature, that are difficult to model accurately. Depending on the system conditions, the estimated lens focus position can be too far from the truth to be useful as the sole focusing approach.

The systems, articles and methods described herein can advantageously speed up and simplify passive fine focus used to reach an optimized or even an optimal focus position, for instance after execution of active triangulation autofocus that was not precise enough to achieve the desired results. In some implementations, the approaches described here can also be used to perform a complete passive focus sweep without a need to calculate contrast.

The systems, articles and methods described herein can be used to find an optimized or even an optimal focus in a series of images during a focus sweep without using feature contrast as an indicator. Instead, a size of a characteristic dimension and/or shape of an aimer pointer is used to choose which image has the optimized or even optimum (i.e., best) focus, focus point or focus distance. Notably, image contrast calculations have some limitations especially in low light and with featureless scenes. In particular, a long exposure time is required to have enough signal for the contrast evaluation to work. The contrast evaluation is usually also quite computationally intensive requiring an analysis of a significant portion of the image. In a system where a fast-focusing lens is available, contrast evaluation sweep can be limited by exposure time and/or required ROI size that is related to sensor readout time.

Measuring aimer pointer size is less computationally intensive, especially if a triangulation system that finds an aimer pointer location to calculate the distance is already present (e.g., U.S. patent application Ser. No. 17/118,374, published as US-2022-0187459-A1). When using a laser beam to produce the aimer pointer, such usually requires lower exposure time because the aimer pointer is usually the brightest scene element at least for indoor scenarios. If the aimer pointer position is known, for example from the opto-mechanical characteristics, the image data can advantageously be windowed using a relatively small region of interest (ROI).

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
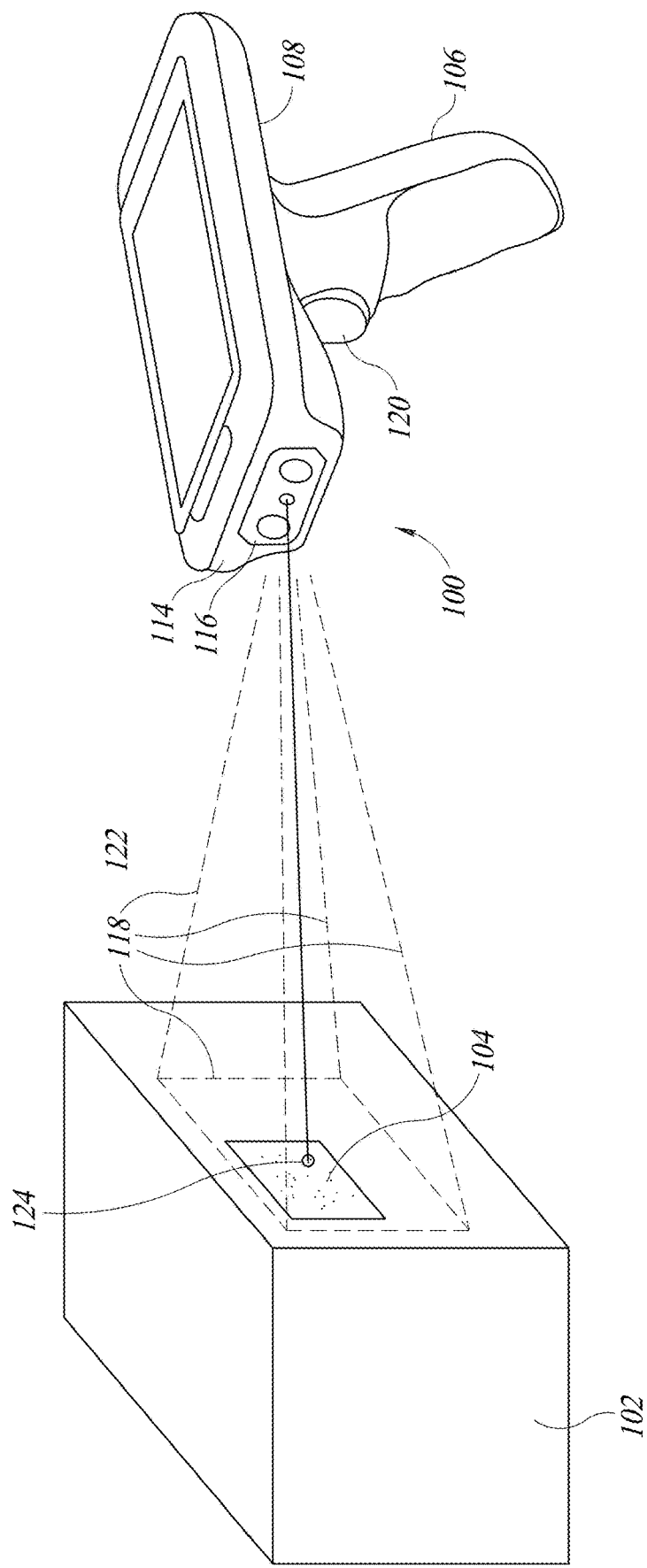
FIG. 1 is a perspective view of an image acquisition system in the form of a machine-readable symbol reader positioned with respect to a target object bearing a machine-readable symbol, according to one illustrated implementation.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with machine-readable symbol readers, optics, aimers, processors, and/or communications networks have not been shown or described in detail to avoid unnecessarily obscuring descriptions of the implementations.

Unless the context requires otherwise, throughout the specification and claims that follow, the word "comprising"

is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the implementations.

Implementations described the present disclosure are directed to systems, articles and methods to perform passive autofocus using an aimer pointer produced by an aimer subsystem of an image acquisition device, which allows for improvements in computational efficiency and/or speed of operation of the image acquisition device. While generally described in terms of machine-readable symbol readers, the teachings herein are not limited to such, but rather can be applied to any device that can project an aimer beam to produce an aimer pointer, that has optics that are adjustable, at least one image sensor that can capture an image of the aimer pointer and/or other objects in a field of view, and at least one processor that can assess characteristics such as a size of a characteristic dimension (e.g., diameter, perimeter, area, diagonal, length of major axis, length of minor axis, ratio of length of major axis to length of minor axis, diagonal axis), shape of, and/or edge sharpness of, the aimer pointer at a variety of focus positions, focal points or focal distances of the optics to determine a focus, focus position, focus point or focus distance that results in an optimized or even an optimal focus. The assessed characteristic is preferably not illumination intensity level. The assessed characteristic is preferably not a position or location of the aimer pointer in an image frame. The approach can advantageously employ a region of interest (ROI) sized to encompass the aimer pointer while omitting large portions of an entire frame of an image. The approach can advantageously employ a laser source to produce the aimer pointer (e.g., laser spot aimer pointer), facilitating detection of the aimer pointer in captured images or image information. The at least one processor can use the determined focus, focus position, focus point or focus distance to configure the image acquisition device to capture images of targets, for example images of machine-readable symbols or other targets, in the field of view. Optionally, the at least one processor can decode the captured machine-readable symbols.

FIG. 1 shows an image acquisition device in the form of a handheld machine-readable symbol reader 100 positioned and oriented with respect to a target object 102 to acquire a machine-readable symbol 104 (e.g., barcode symbol, QR code symbol) carried or otherwise borne by the target object 102.

The handheld machine-readable symbol reader 100 may be an imaging based machine-readable symbol reader. The handheld machine-readable symbol reader 100 optionally includes a gripping portion 106 shaped and sized to be grasped by an operator's hand and a scanning head portion 108 extending from an upper portion of the gripping portion. A lower portion of the gripping portion 106 may be shaped and sized to be received in a docking station (not shown), for example to receive power for recharging and/or to transfer data. The machine-readable symbol reader 100 includes a front wall 114 of the scanning head portion 108. The scanning head portion 108 also includes one or more transparent windows 116 on the front wall 114, behind which is positioned a camera subsystem 202 (FIG. 2) and aimer subsystem 214 (FIG. 2), which are discussed below.

The machine-readable symbol reader 100 may be used in at least one of a handheld mode or a fixed position mode. In the fixed position mode, the reader 100 may be received in a docking station and the target object 102 having a machine-readable symbol 104 may be brought within the angular field of view (FOV) 118 (projection shown in broken line) of the machine-readable symbol reader 100 to cause the machine-readable symbol reader 100 to read and/or detect the machine-readable symbol 104. In the handheld mode, the reader 100 may be carried by an operator and positioned such that the surface of the target object 102 carrying the machine-readable symbol 104 is within the FOV 118 of the machine-readable symbol reader 100. In the handheld mode, imaging and decoding of the target machine-readable symbol 104 may be initiated automatically or alternatively by the operator actuating (e.g., depressing) a trigger 120, for example.

For the purpose of this description, a handheld imaging based machine-readable symbol system 100 is discussed. However, it will be apparent to one of ordinary skill in the art that the techniques and devices described herein can be practiced advantageously with stationary, mobile, bi-optic, or other types of readers, or scan engines or with other suitable image acquisition devices.

As noted above, machine-readable symbol reader 100 includes an aimer subsystem 214 (FIG. 2) operable to emit an aimer beam 122, for example, from at least one window 116 of the front wall 114 of the scanning head portion 108 of the machine-readable symbol reader. In the illustrated implementation, the aimer subsystem 214 projects the aimer beam 122 outwardly from the front wall 114. The aimer beam 122 forms an aimer pointer 124 on the target object 102, facilitating the aiming (e.g., positioning, orientating) of the FOV 118 of the machine-readable symbol reader 100 relative to a machine-readable symbol 104 to be read. The aimer pointer 124 can have any of a large variety of shapes. In at least some implementations, the aimer pointer 124 takes the form of a spot (e.g., circular, oval, elliptical) of light when striking a flat face of the target object 102 orthogonally. Such can allow the use of a relatively small region of interest (ROI) as described herein. Alternatively, the aimer pointer 124 can have a more complex shape, for example a cross, bullseye pattern, a rectangle or box, or portions of a rectangle or box (e.g., two opposed corners, two pairs of opposed corners). The aimer beam 122 can, for example, take the form of a laser beam, generated by a laser source (e.g., laser diode). Such can advantageously facilitate detection and processing, as described herein. The aimer subsystem 214 may be positioned behind the window 116 adjacent the camera subsystem 202 (FIG. 1). A length of the laser beam 122 is dependent on the distance of the target object 102 from the machine-readable symbol reader 100. In addition to allowing the operator to aim the machine-readable symbol reader 100 with respect to the machine-readable symbol 104 borne on the surface of the target object 102, the aimer pointer 124 is also advantageously utilized to perform passive autofocusing, determining an optimized or even optimal focus of optics for a given position of the machine-readable symbol reader 100 relative to the target object 102, as discussed further below.

Figure 2:
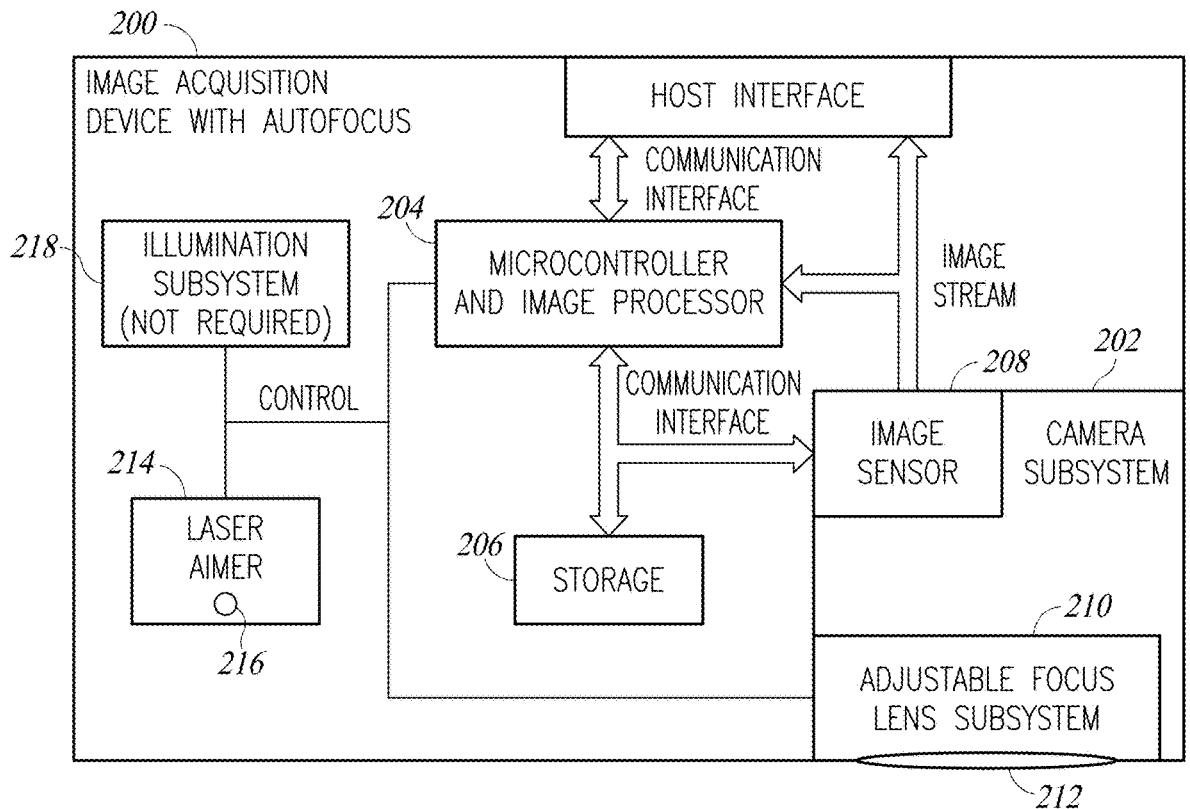
FIG. 2 is a functional block diagram of a machine-readable symbol reader, according to one illustrated implementation.

FIG. 2 is a block diagram of an image acquisition device in the form of an imaging based machine-readable symbol reader 200 in accordance with at least some implementations of the present disclosure. The machine-readable symbol reader 200 may be similar or even identical to the handheld machine-readable symbol reader 100 of FIG. 1.

The machine-readable symbol reader 200 includes a camera subsystem 202 which captures image frames or portions thereof, or image information. The camera subsystem 202 can, for example, capture an image of, or image information that represents, the aimer pointer 124 (FIG. 1) and/or capture an image of, or image information that represents, graphical indicia such as the machine-readable symbol 104 (FIG. 1), which are present in the FOV 118 of the camera subsystem 202 of the machine-readable symbol reader 200. The machine-readable symbol reader 200 also includes one or more processors 204 operatively coupled to one or more nontransitory processor-readable storage media 206. The nontransitory processor-readable storage media 206 stores passive autofocus processor-executable instructions or logic and optional stores decoder processor-executable instructions or logic 210. Execution of the decoder instructions or logic by the processor(s) 204 causes the processor(s) 204 to decode encoded indicia within a captured image frame. Execution of the passive autofocus instructions or logic by the processor(s) 204 causes the processor(s) 204 to determine an optimized or even optimal focus, focus position, focus point or focus distance given the distance of a target object relative to the machine-readable symbol reader 200, as discussed below. The passive autofocus instructions or logic and the decoder instructions or logic may be executed by the one or more processors 204, for example by a same processor, by respective processors, or even each by multiple processors. In some implementations, one or both of the passive autofocus instructions or logic and the decoder instructions or logic are implemented by multiple processors, by other hardware, or by any combination thereof. In one or more implementations, the one or more nontransitory storage media 206 can include volatile memory (e.g., random access memory (RAM)) that, for example stores acquisitions (e.g., image information) which are to be processed, and non-volatile memory (e.g., read only memory (ROM), FLASH memory, spinning media storage) that, for example stores processor-executable instructions or logic. Generally, the passive autofocus instructions or logic and the decoder instructions or logic can be implemented in any suitable manner, including hardware, software, electrical circuitry, firmware, via one or more of: one or more application specific integrated circuits (ASICs), one or more graphic processing units (GPUs), one or more digital signal processors (DSPs), one or more programmable gate arrays (PGAs) for instance field programmable gate arrays (FPGAs) or complex programmable logic devices (CPLDs), and/or one or more microcontrollers, or any combination thereof.

The camera subsystem 202 includes one or more image sensors 208, one or more adjustable focus optics subsystems 210 with optics 212 having an adjustable focus, and optionally one or more shutters. In some implementations, a shape of one or more lenses can be adjusted, for example a microfluidic lens. In some implementations, a distance of one or more lenses can be adjusted, for example with respect to an aperture or with respect to one or more other lenses.

The image sensor(s) 208 can take a variety of forms, for example a global shutter image sensor, a rolling shutter image sensor, and/or an event-based image sensor as discussed with reference to FIGS. 3A and 3B below.

The adjustable focus optics subsystems 210 includes one or more actuators (now shown) operable to adjust the focus of the optics 212. The optics 212 can take a variety of forms including a single lens, multiple lenses, compound lenses, micro-electro-mechanical system (MEMS) lenses, microfluidic lenses, lenses with non-zero optical power, lenses with zero optical power, mirrors or reflectors, dichroic mirrors, prisms, optical filters, etc. The actuator(s) can take any of a large variety of forms, the particular actuator being a function of the particular optics. Actuators can include, for example, one or more of solenoids, magnets, electromagnets, electrodes, electric motors, etc., coupled to vary a shape of one or more of the optics 212 and/or to vary a position of one or more of the optics 212 either with respect to the image sensor(s) 208 and/or with respect to other ones of the optics 212 or with respect to the window 116 (FIG. 1).

The optics (e.g., focusing lens) 212 of the adjustable focus optics subsystems 210 focuses light reflected and scattered from the target machine-readable symbol 104 (FIG. 1) onto the at least one image sensor 202, typically through an aperture. As described herein, the adjustable focus optics subsystems 210 initially focuses an image of an aimer pointer 124 (FIG. 1) onto an array of pixels of the image sensor(s) 208 at various different focus positions or settings as part of performing the passive autofocus. As also described herein, once the passive autofocusing is complete, the adjustable focus optics subsystem 210 focuses the target machine-readable symbol 104 (assuming the symbol is within the FOV) onto the array of pixels of the image sensor(s) 208, thereby enabling the image sensor(s) 208 to capture an image of, or at least capture image information representative of, a target object (e.g. target machine-readable symbol 104 (FIG. 1)) that appears within a FOV 118 (FIG. 1) of the camera subsystem 202 during an exposure period. The FOV 118 (FIG. 1) of the camera subsystem 202 may be a function of the configuration of the image sensor(s) 208, the optical characteristics of the optics 212 of the adjustable focus optics subsystems 210, and a distance and orientation between the image sensor(s) 208 and the optics 212.

The image sensor(s) 208 can take a large variety of forms, for example an array of a charged coupled devices (CCDs), an array of complementary metal oxide semiconductor (CMOS) devices, or other imaging pixel array. The image sensor(s) 208 may have various numbers of pixels arranged in various dimensions along X and Y axes. The pixels of the image sensor(s) 208 should generally be large enough to provide adequate SNR performance when combined with the image forming optics 212 and the related aperture.

The optics 212 may include a wide angle lens which provides an angular FOV. The optics 212 may have a relatively short focal length which allows for implementing an overall camera subsystem 202 which has relatively small overall length. The aperture of the camera subsystem 202 provides the desired depth of Field (DoF). In some implementations, the camera subsystem 202 may be characterized by any suitable f-number for any specific intended application.

The machine-readable symbol reader 200 includes an aimer subsystem 214 to generate the visible aimer pointer 124 (FIG. 1) to aid the operator in aiming the machine-readable symbol reader 200 relative to the target machine-readable symbol 104 and which is used in performing the passive autofocusing. In some implementations, the aimer subsystem 214 may include a light source 216 (e.g., one or more LEDs, lasers, superluminescent diodes). The light source is preferably a laser light source, for instance a laser diode 216. The aimer subsystem 214 can optionally include one or more of: a focusing lens (e.g., collimator), aperture, and/or a pattern generator (e.g., beam shaper) to generate a desired shape of the aimer pointer 124 (FIG. 1). In some implementations, the focusing lens and the pattern generator may be formed in a single optical element.

In some implementations, the aimer pointer 124 (FIG. 1) is used by the operator to position and/or orient the FOV 118 (FIG. 1) to encompass a target (e.g., machine-readable symbol 104). In at least one implementation, the machine-readable symbol reader 100, 200 performs passive autofocusing, and on completing such acquires an image of, or image information from, the machine-readable symbol 104, employing configuration parameters that are dependent on an outcome of the passive autofocusing. In some implementations, the machine-readable symbol reader 100, 200 can automatically start the passive autofocusing on detecting a return or reflection of the aiming pointer 124. Alternatively, the operator can depress a trigger 120 (FIG. 1) to start the passive autofocusing. In some implementations, the machine-readable symbol reader 100, 200 automatically reads or captures an image of, or image information from, the target machine-readable symbol 104 (FIG. 1) on completion of the passive autofocusing. In yet other implementations, the machine-readable symbol reader 100, 200 reads or captures an image of, or image information from, the target machine-readable symbol 104 (FIG. 1) in response to the operator actuating the trigger 120 on completion of the passive autofocusing, for example in response to a visual or aural indication that the passive autofocus has been completed. In some implementations, the machine-readable symbol reader 100, 200 has a two-position trigger 226, where the first position activates the aimer subsystem 214 and the second position activates reading of the machine-readable symbol 104 (FIG. 1). In some implementations, the machine-readable symbol reader 100, 200 includes an optional motion detector (e.g., accelerometer) that is used to activate the aimer subsystem 214 upon detection of movement of the reader, which may signify that an operator has picked up the machine-readable symbol reader 100, 200 for a reading operation.

The aimer subsystem 214 may project a line having an angular field of projection (FOP) which is less than the FOV of the camera subsystem 202 so that the line projects to only a portion (e.g., a substantially central portion) of the FOV of the camera subsystem. In at least some implementations, it is preferred that the line visually appears as a simple spot aimer pointer 124 when projected orthogonally onto a flat or almost flat surface. In some implementations, it is preferred that a laser source 216 is employed, as such is readily discernable by the image sensor(s) 208 even in outdoor or other uncontrolled conditions.

The machine-readable symbol reader 100, 200 optionally includes a flood illumination subsystem 218. The flood illumination subsystem 218 includes one or more light sources operable to provide flood illumination simultaneously across an entirety of the machine-readable symbol 104 (FIG. 1). Light sources can, for example, include at least one of a light emitting diodes (LEDs), incandescent lights, or superluminescent diodes. The flood illumination subsystem 218 can be activated in response to completion of passive autofocusing to facilitate the capture of images of, or image information from, the machine-readable symbol 104 (FIG. 1).

As discussed further below, the decoder logic or instructions can decode any decodable image within one or more images captured by the camera subsystem 202. Various decoding techniques can be employed. If the decoding is successful, decoded data, representative of the data/information coded in the machine-readable symbol 104, is then output via a data input/output system, which may include one or more of a wired/wireless communications port, a display, LEDs, an audio output, touchscreen, keys, buttons, etc. Upon a successful imaging and decoding of the machine-readable symbol 104, the input/output system may provide feedback to the operator in the form of a visual indicator and/or an audible indicator.

Figure 3A:
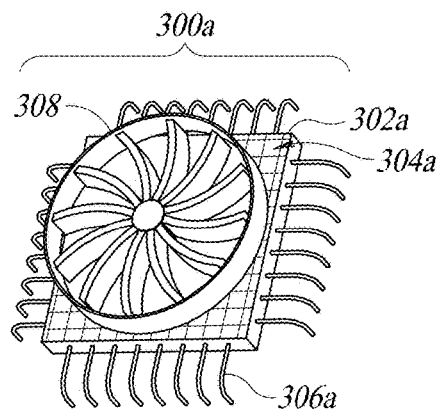
FIG. 3A is a schematic diagram of a shutter image sensor which can be employed as part of a machine-readable symbol reader of FIGS. 1 and 2, according to one illustrated implementation.

FIG. 3A is a schematic diagram of a shutter image sensor 300a which can be employed as part of the machine-readable symbol reader 100, 200 of FIGS. 1 and 2, according to one illustrated implementation.

The shutter image sensor 300a can take the form of a global shutter image sensor 300a or a rolling shutter image sensor. In either case, the pixels of the shutter image sensor 300a are exposed to light during determined time windows, and an entire image is output during a readout phase as a frame with the intensity value of all image pixels. Frames are output at intervals determined by the frame rate.

The shutter image sensor 300a includes an image sensor 302a comprising an array of light sensitive pixels 304a. The image sensor 302a can include a plurality of output contacts (e.g., pins) 306a (only one called out) to provide output data for the pixels to a processor, register or other memory. The shutter image sensor 300a also optionally includes one or more physical shutters 308 operable to selectively simultaneously expose all of the pixels of the array of light sensitive pixels 304a to incoming light. The shutter(s) 306 is positioned between the array of light sensitive pixels 304a and an exterior of the machine-readable symbol reader 100, 200. Alternatively, shutter image sensor 300a optionally implements a logical rolling shutter, for example by successively sampling a plurality of regions (e.g., row by row or groups of rows by groups of rows) of the array of light sensitive pixels 304a.

Figure 3B:
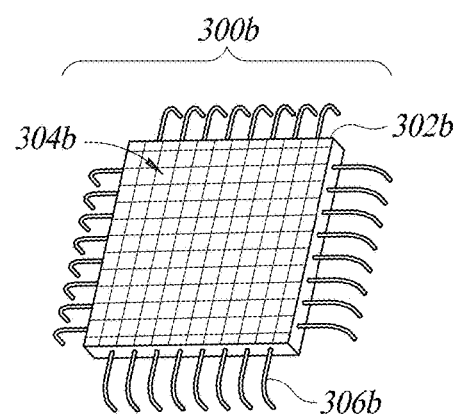
FIG. 3B is a schematic diagram of an event-based image sensor which can be employed as part of a machine-readable symbol reader of FIGS. 1 and 2, according to one illustrated implementation.

FIG. 3B is a schematic diagram of an event-based image sensor 300b which can be employed as part of the machine-readable symbol reader of FIGS. 1 and 2, according to one illustrated implementation.

In contrast to shutter image sensors 300a (FIG. 3A), event-based image sensors utilize an event-based approach that asynchronously detects pixel luminance changes and outputs data with pixel position (e.g., XY coordinates) and time information.

The event-based image sensor 300b includes an image sensor 302b comprising an array of light sensitive pixels 304b. Each pixel is equipped with a signal processing circuit that detects luminance changes. The event-based image sensor 300b can include a plurality of output contacts (e.g., pins) 306b (only one called out) to provide output data for the pixels to a processor, register or other memory. The array of light sensitive pixels 304b are operable to selectively output a signal only when an illumination intensity level sensed by a respective pixel has changed relative to a most immediate previously sensed illumination intensity level. Thus, the output will be provided only for those pixels that have experienced a change. In some implementations, the amount of change may need to exceed a specified threshold in order to trigger an output. The output can indicate that a change has occurred, and can even indicate a direction of change (e.g., whether the intensity increased or decreased), although will not typically provide any indication of the magnitude of the change. Event-based image sensors 300*b* advantageously immediately detect luminance changes with high-speed, low-latency, and high-temporal-resolution.

In some implementations, an image acquisition system (e.g., a machine-readable symbol reader) can include two or more image sensors, for example a global shutter image sensor and an event-based image sensor. In such an implementation, the event-based image sensor can be used for the optimal focusing search while the global shutter image sensor can be used to regulate the focus based on the focus position found by the event-based image sensor in order to acquire images for decoding.

Figure 4:
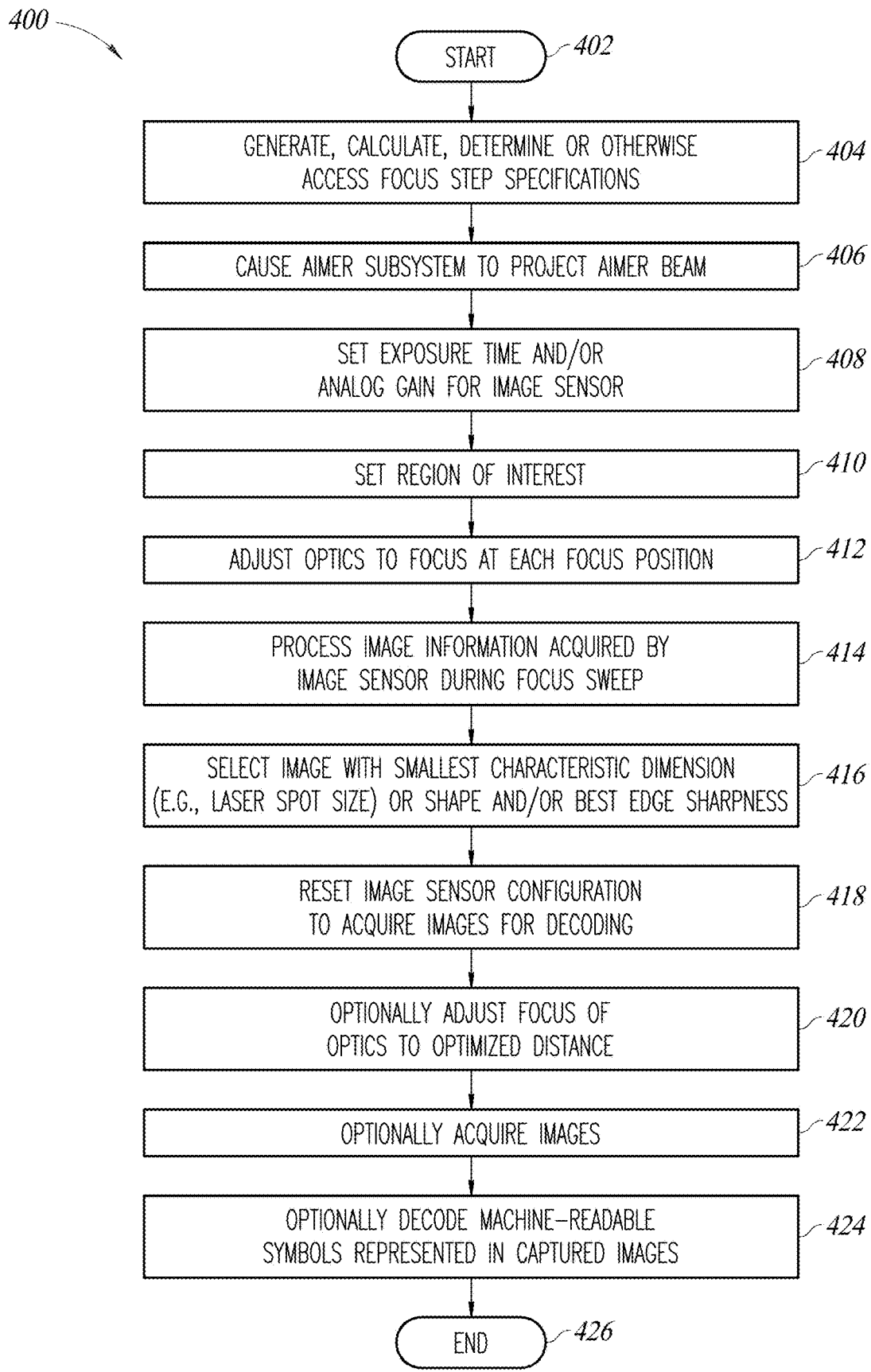
FIG. 4 is a flow diagram of a method of operation of an image acquisition system described in terms of a machine-readable symbol reader that implements passive autofocusing, according to one illustrated implementation, to capture images of, and to optionally decode, a machine-readable symbol on a target object.

FIG. 4 shows a method 400 of operation of an image acquisition system described in terms of a machine-readable symbol reader that implements passive autofocusing, according to one illustrated implementation, to capture images of, and optionally to decode, a machine-readable symbol on a target object, according to one illustrated implementation. The method 400 may be executed by an image acquisition system, for example a machine-readable symbol reader such as the machine-readable symbol readers 100, 200 of FIGS. 1 and 2.

As previously discussed, the machine-readable symbol reader may include an aimer subsystem operable to project an aimer beam outward of the machine-readable symbol reader to produce an aimer pointer. The machine-readable symbol reader may also include optics that have an adjustable focus. The machine-readable symbol reader may also include at least one image sensor with an optical path that provides a FOV that extends through the optics outward from the machine-readable symbol reader. The at least one image sensor is operable to capture image information from objects appearing in a FOV, including the aimer pointer, and any machine-readable symbols. The machine-readable symbol reader may further include one or more processors that perform passive autofocus, configures the machine-readable symbol reader to capture image information from machine-readable symbols appearing in the FOV and optionally decode the captured machine-readable symbols.

The systems and methods described herein can advantageously replace classic contrast autofocus sweep, for instance in executing a complete passive focus run or in executing a fine focus sweep around an estimated focus position calculated, for instance, from a distance to focus triangulation formula.

The method 400 starts at 402, for example, when a user picks up a machine-readable symbol reader to scan a machine-readable symbol (e.g., 1D or 2D barcode, alphanumeric characters) borne by a target object or item (e.g., clothing, packaging, circuit board, label), for instance when a trigger is actuated, or when a target object or item is otherwise presented to the machine-readable symbol reader.

At 404, at least one processor of the machine-readable symbol reader can generate, calculate, determine or otherwise access focus step specifications also referred to as a set of focus positions or focus position steps. The focus positions or focus position steps specify a number of specific focus positions or focus position steps of the optics to be tried (e.g., swept through). For example, the at least one processor of the machine-readable symbol reader can generate, calculate, determine or select the set of focus position steps based, for example, on an initial estimate of a distance to a target object. An estimate, such as active distance information, can advantageously allow the use of a relatively small set of focus positions or focus position steps, arrayed around a calculated best focus estimation. If active distance information is not available, the at least one processor can generate, calculate, determine the set of focus positions or focus position steps to ensure coverage of all possible focus positions.

At 406, at least one processor of the machine-readable symbol reader can cause the aimer subsystem to project an aimer beam outward of the machine-readable symbol reader to produce an aimer pointer. The aimer pointer can be used to position and/or orient the machine-readable symbol reader, and in particular to position and/or orient a field of view of the at least one image sensor of the machine-readable symbol reader, relative to the target object. As described herein, the aimer pointer is also used to perform the passive autofocusing. The aimer subsystem can, for example turn ON or activate an illumination source, for example a laser diode, to generate the aimer beam.

At 408, at least one processor of the machine-readable symbol reader can set an exposure time (e.g., a fixed exposure time) and/or, an analog gain (e.g., a fixed analog gain) for at least one image sensor of the machine-readable symbol reader, the exposure time and/or analog gain being suitable to correctly expose the aimer pointer (e.g., laser spot). Different types of aimer pointers, and in particular different types of aimer illumination (e.g., illumination intensity, wavelength) and target object reflectance can specify different exposure times and analog gains. The use of a laser source to generate an aimer beam can cause the exposure time to be relatively brief and analog gain relatively small even in low light conditions since these values are only a function of laser optical power, target reflectivity and target color. A small exposure time is useful to increase the frame rate during a focus position sweep phase (i.e., sweeping through focus positions or focus position steps).

At 410, at least one processor of the machine-readable symbol reader can set a suitable region of interest (e.g., a fixed region of interest, or fixed ROI) to acquire an image of, or image information from, the aimer pointer, while not acquiring much additional image or image information. In a triangulation system, the ROI is usually a small stripe oriented on a same axis as a mechanical offset between the aimer and the receiver (e.g., photodiode). The ROI can be a small portion of the complete image, for example a subset of pixels of the at least one image sensor, the subset of pixels corresponding to an area in which the aimer pointer is expected or predicted to appear within an entire frame. Use of a ROI can advantageously speed up readout time and therefore speed up the frame rate during the sweep phase. Frame rate is typically limited by a longest of exposure time and readout time. Employing a ROI reduces the number of pixels that are sampled and reduces the amount of image information to be processed, advantageously reducing computational complexity and increasing speed.

At 412, at least one processor of the machine-readable symbol reader can adjust the optics (e.g., one or more lenses) to focus at each of the focus positions or focus position steps while acquiring images or image information at each of the focus positions or focus position steps. Thus, the processor sweeps through the set of focus positions or focus position steps acquiring images or image information at each focus position or focus position step. The speed of the sweep is limited by the longest of sensor frame rate and time to adjust the focus of the optics (e.g., lens focus time).

At 414, at least one processor of the machine-readable symbol reader can process the images or image information acquired by the at least one image sensor during the focus sweep. The processing can include determining characterizing aspects of at least one of the one or more characteristics of the aimer pointer in the frame, for example, determining a size of at least one characteristic dimension (e.g., diameter, perimeter, area, diagonal, length of major axis, length of minor axis, ratio of length of major axis to length of minor axis, diagonal axis) and/or shape of the aimer pointer and/or determining an edge sharpness (e.g., a measure of an edge sharpness) of the aimer pointer (e.g., aimer illumination spot, aimer laser spot). This image processing, used to find and characterize the aimer pointer inside a frame of the image, can be performed with various techniques, for example those used in performing laser triangulation.

Figure 5A:
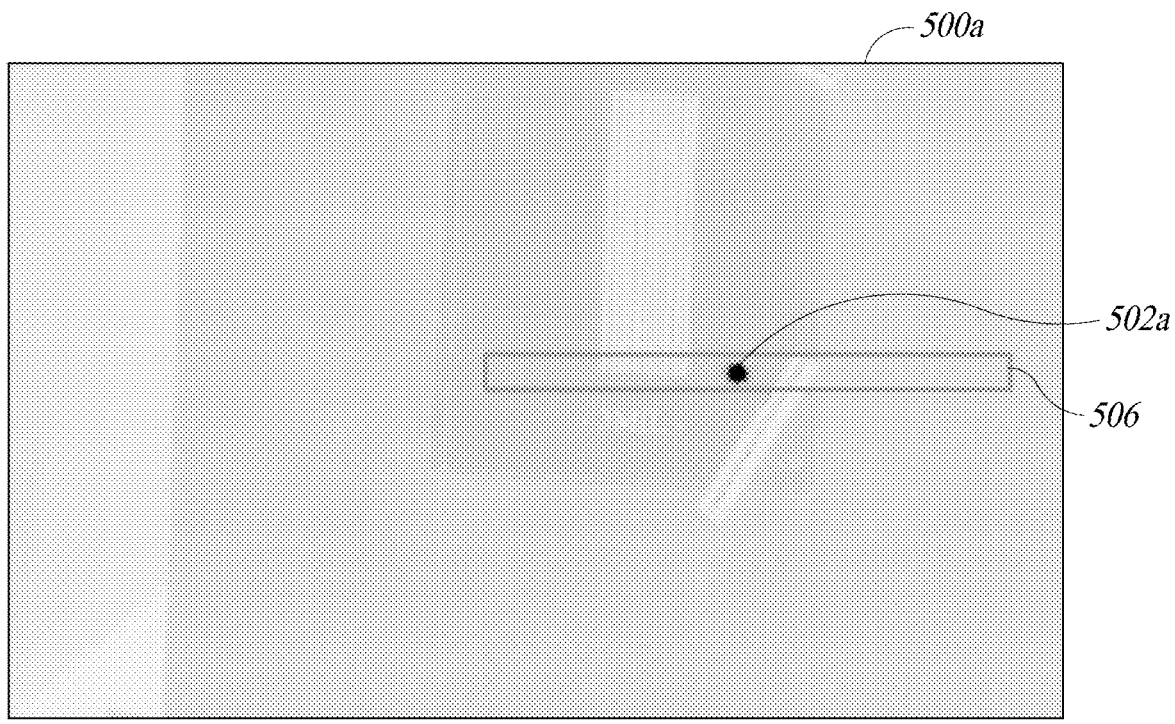
FIG. 5A is a graphic representation of a field of view of an image acquisition system including an aimer pointer in the form of a laser spot produced on a target object at a first focus, focus point or focus distance by an illumination source (e.g., laser) of an aimer subsystem, for instance an aimer subsystem of a machine-readable symbol reader, according to one illustrated implementation.
Figure 5B:
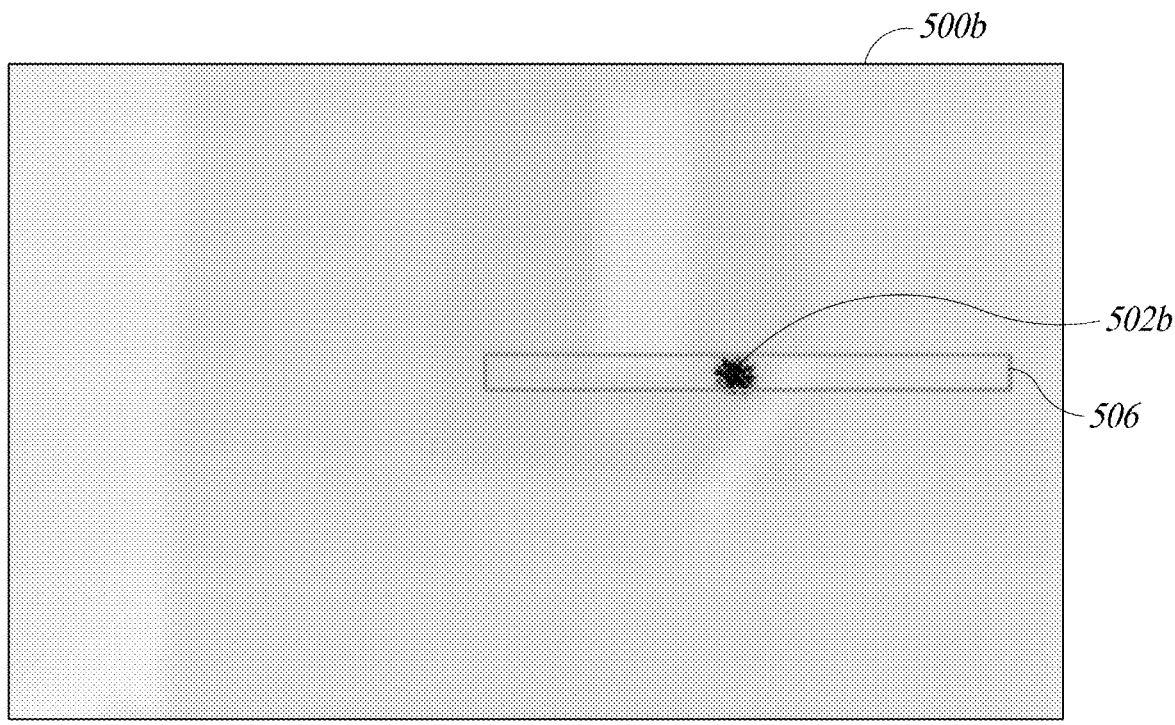
FIG. 5B is a graphic representation of the field of view of the image acquisition system including the aimer pointer in the form of the laser spot produced on the target object at a second focus, focus point or focus distance by the illumination source (e.g., laser) of the aimer subsystem, for instance an aimer subsystem of a machine-readable symbol reader, according to one illustrated implementation.

At 416, at least one processor of the machine-readable symbol reader can select the image with the smallest characteristic dimension (e.g., smallest laser spot size), shape, and/or with the best edge sharpness (e.g., sharpest edge) as the best focus position or focal distance in the focus sweep and move the lens to the selected focus position, which is illustrated in FIGS. 5A and 5B and discussed below.

At 418, at least one processor of the machine-readable symbol reader can reset image sensor configuration (exposure, gain, windowing) to acquire the images for decoding. The image sensor configuration can be dependent on the characteristics of the image sensor(s), the reflectivity of the target object or machine-readable symbol, and/or the optics.

Optionally, at 420, a focus of the optics is adjusted based on an optimized focal position determined via the passive autofocusing, if focus of the optics is not already set to the optimized focal position.

Optionally at 422, the at least one image sensor acquires images or image information using the reset image sensor configuration and the optimized focal position. The images or image information can, for instance, represent one or more machine-readable symbols in the FOV of the machine-readable symbol reader or image sensor(s) thereof.

Optionally at 424, at least one processor decodes the machine-readable symbols represented in the captured images. Conventional machine-readable symbol decoding techniques can be employed.

The method 400 can terminate at 426, for example until invoked again. Alternatively, the method 400 can repeat continually. In some implementations, the method 400 can be executed by multiple threads, for example via a multi-threaded processor.

While the method 400 is illustrated and described as an ordered series of acts or operations, in some implementations the method can omit some acts or operations, include other acts or operations and/or can perform some acts or operations in a different order than illustrated. In some implementations, the passive autofocus sequence of the method 400 can restart, for instance on the occurrence of a timeout, and end condition, or if the scene changes or a scene brightness changes beyond a set brightness change threshold.

FIG. 5A shows a field of view 500a of an image acquisition system including an aimer pointer in the form of a laser spot 502a produced on a target object 504 at a first focal distance by an illumination source (e.g., laser) of an aimer subsystem, for instance an aimer subsystem of a machine-readable symbol reader, according to one illustrated implementation.

FIG. 5B shows a field of view 500b of the image acquisition system including the aimer pointer in the form of the laser spot 502b produced on the target object 504 at a second focal distance by the illumination source (e.g., laser) of the aimer subsystem, for instance an aimer subsystem of a machine-readable symbol reader, according to one illustrated implementation.

As can be seen by comparing FIGS. 5A and 5B, there is a relationship between focus and size of a characteristic dimension (e.g., diameter, perimeter, area, diagonal, length of major axis, length of minor axis, ratio of length of major axis to length of minor axis, diagonal axis) of the laser spot 502a, 502b. The optimized focus (e.g., best focus, focus position, focus point or focus distance) is typically associated with the smallest size of the characteristic dimension of the laser spot 502a, 502b.

FIGS. 5A and 5B also show an example region of interest (ROI) 506. The ROI can specify a region in which the aimer pointer (e.g., laser spot 502a, 502b) is likely or expected or predicted to appear. Thus the ROI can be employed to reduce the amount of image information that needs to be captured by the image sensor, read from the image sensor, and/or processed by a processor as part of the passive autofocusing, thereby advantageously reducing the time to read and process image information from the image sensor and/or increasing a rate of frame captures (frame rate) of the image sensor.

If the passive autofocus system uses an event-based image sensor, the method described with respect to FIGS. 6A and 6B might be particularly efficient, and so its event based nature and representation of differences can be exploited to have a very accurate, fast, and easy to compute way to adjust the focus, as will be described below.

The image information provided to the processor by event-based image sensors (aka event-based cameras) is only that related to the changes in brightness of the pixels. This is in contrast to shutter image sensors (aka, shutter camera) which provide the values of all pixels of the frame. This means that if the only thing that changes significantly is a size of the aimer pointer, it will be very clear whether the image sensor is in focus or not, while allowing a very high frame rate as compared to a shutter image sensor since there is no need to wait for a shutter to open and close and no need to readout all the pixels in the ROI. So, while a focus of the optics (e.g., lens) is adjusted, it can be determined in real time or near real time whether a size of the aimer pointer is shrinking or growing, and determine in which direction to focus (toward near focus, toward far focus) and when an optimized focal position is achieved.

When the correct focus has been determined, the aimer beam can be turned OFF and then an optional general illuminator (e.g., flood illumination) can be turned ON so that the image sensor will capture images or image information and output image data (e.g., digital image data) to be processed, analyzed, and/or decoded depending on the purpose of the specific application. An exemplary method of implementing such is described with reference to FIGS. 6A and 6B, below.

Figure 6A:
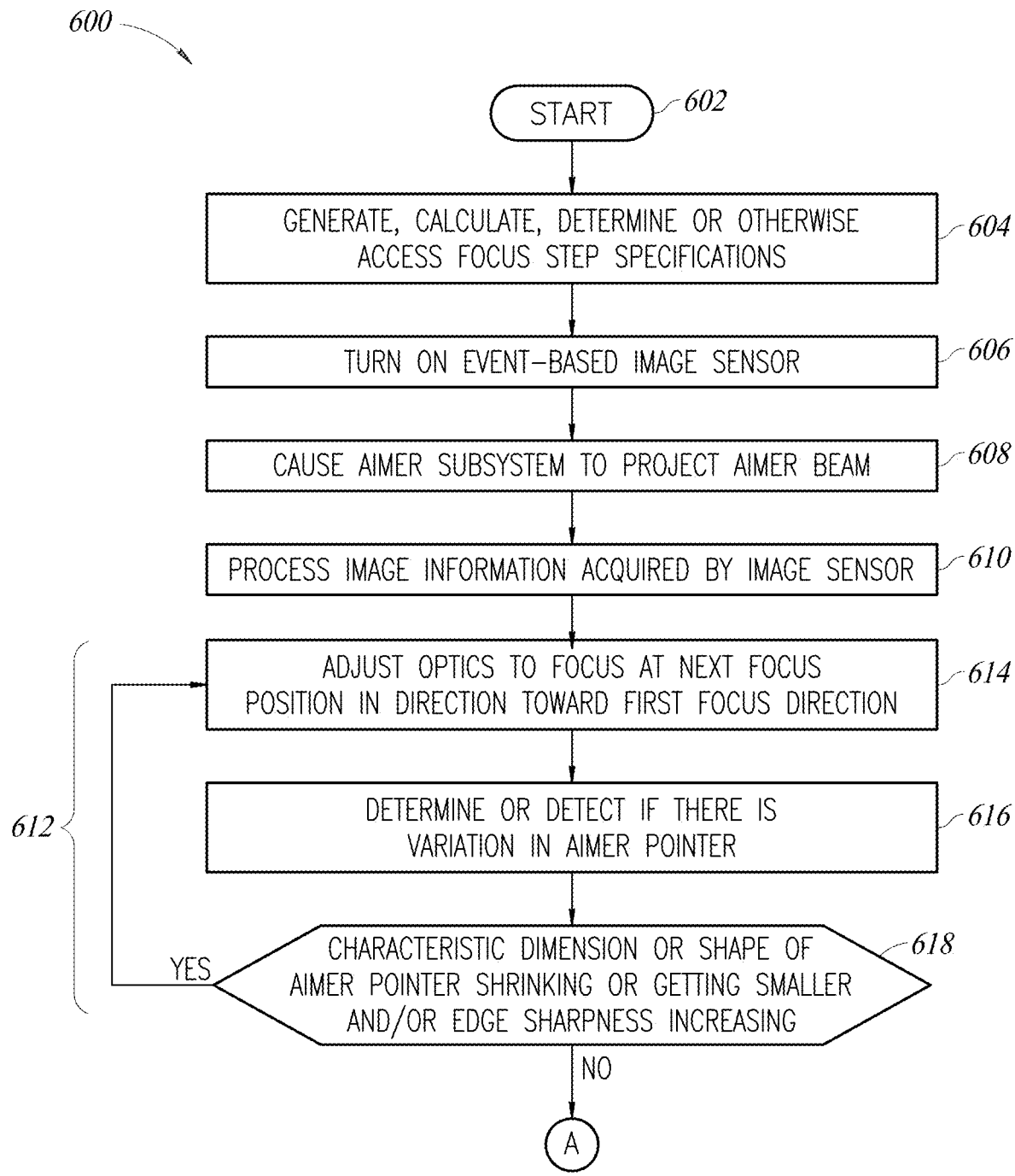
FIGS. 6A and 6B are a flow diagram of a method of operation of an image acquisition system described in terms of a machine-readable symbol reader having an event-based image sensor and that implements passive autofocusing, according to one illustrated implementation, to capture images of, and to optionally decode, a machine-readable symbol on a target object.
Figure 6B:
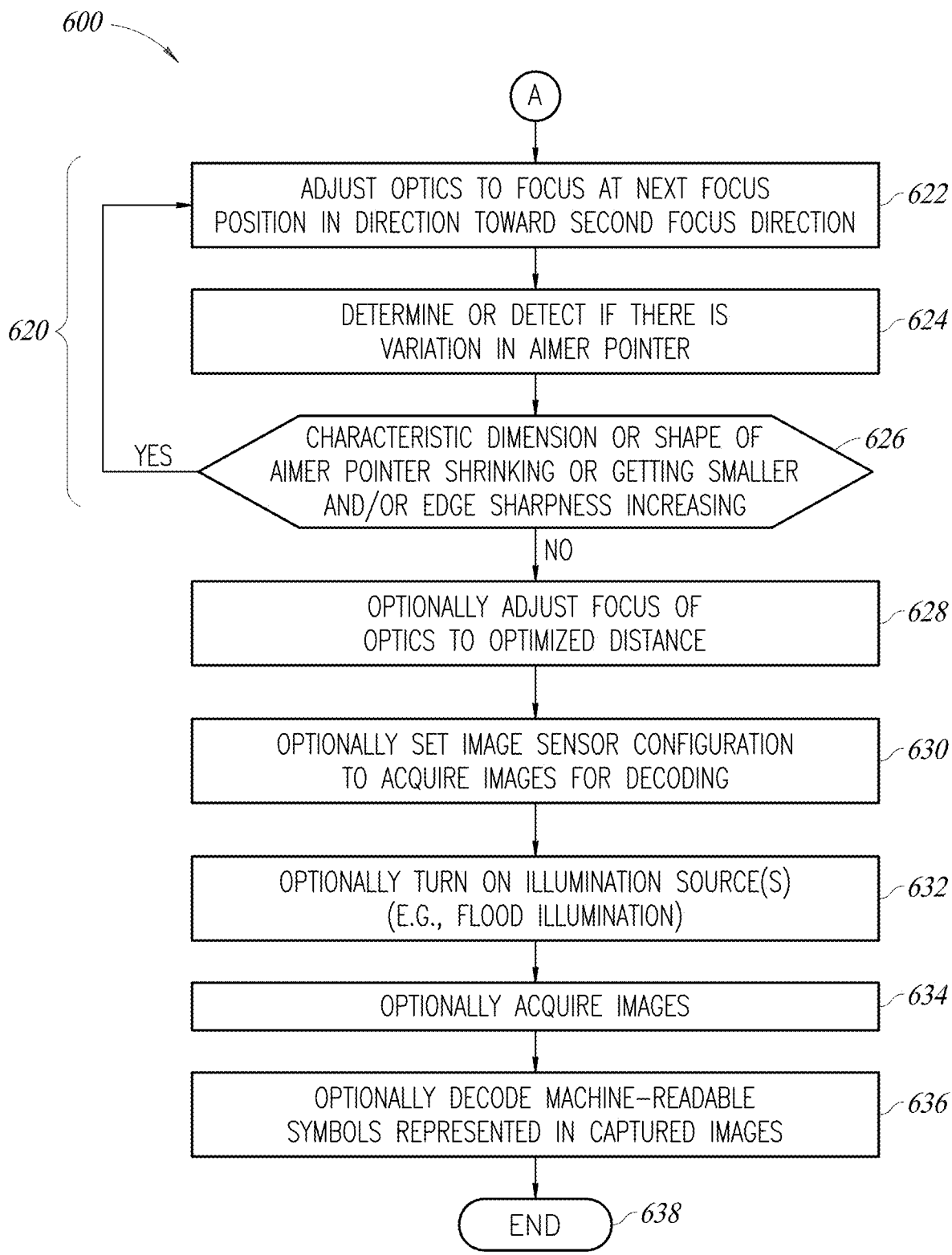

FIGS. 6A and 6B show a method 600 of operation of an image acquisition system described in terms of a machine-readable symbol reader that implements passive autofocusing, according to one illustrated implementation, to capture images of, and to decode, a machine-readable symbol on a target object. The method 600 may be executed by an image acquisition system, for example a machine-readable symbol reader such as the machine-readable symbol readers 100, 200 of FIGS. 1 and 2, and may in particular take advantage of an event-based image sensor, for example the event-based image sensor 300b (FIG. 3B).

As previously discussed, the machine-readable symbol reader may include an aimer subsystem operable to project an aimer beam outward of the machine-readable symbol reader to produce an aimer pointer. The machine-readable symbol reader optics can also include optics that have an adjustable focus. The machine-readable symbol reader optics can also include at least one image sensor with a FOV that extends through the optics outward of the machine-readable symbol reader and is operable to capture images of, or image information from, what appears in the FOV including the aimer pointer and machine-readable symbols. The machine-readable symbol reader optics can further include at least one processor that performs passive autofocus, configures the machine-readable symbol reader to capture image information from machine-readable symbols appearing in the FOV and optionally decode the captured machine-readable symbols.

The systems and methods described herein can advantageously replace classic contrast autofocus sweep, for instance in executing a complete passive focus run or in executing a fine focus sweep around an estimated position calculated, for instance, from a distance to focus triangulation formula. In general, focus can be adjusted in two opposite directions, toward near focus or toward far focus. In some implementations, focus can initially be adjusted toward near focus and subsequently adjusted toward far focus. In some implementations, focus can initially be adjusted toward far focus and subsequently adjusted toward near focus. Thus, the method 600 is described with respect to a first direction of focus and a second direction of focus, to make clear that the method 600 applies to either implementation without regard to which direction of focus is employed first.

The method 600 starts at 602, for example, when a user picks up a machine-readable symbol reader to scan a machine-readable symbol (e.g., 1D or 2D barcode, alphanumeric characters) placed on a target object or item (e.g., clothing, packaging, circuit board), or when a trigger is actuated, or when a target object or item is otherwise presented to the machine-readable symbol reader.

At 604, at least one processor of the machine-readable symbol reader can generate, calculate, determine or otherwise access focus step specifications also referred to as a set of focus position steps. The focus positions or focus position steps specify a number of specific focus positions or focus position steps of the optics to be tried (e.g., swept through). For example, the at least one processor of the machine-readable symbol reader can generate, calculate, determine or select the set of focus position steps based, for example, on an initial estimate of a distance to a target object. An estimate, such as active distance information, can advantageously allow the use of a relatively small set of focus position step, arrayed around a calculated best focus estimation. If active distance information is not available, the at least one processor can generate, calculate, determine the set of focus position steps to ensure coverage of all possible focus positions, although all focus positions or focus position steps may not be stepped through in any given iteration of the method 600.

At 606, the event-based image sensor is turned ON. For example, at least one processor of the machine-readable symbol reader can the turn ON the event-based image sensor or cause image information to be captured, read from or otherwise received from the event-based image sensor.

At 608, at least one processor of the machine-readable symbol reader can cause the aimer subsystem to project an aimer beam outward of the machine-readable symbol reader to produce an aimer pointer. The aimer pointer can be used to position and/or orient the machine-readable symbol reader, and in particular a FOV of the machine-readable symbol reader and/or image sensor thereof, relative to the target object. The aimer subsystem can, for example turn ON or active an illumination source, for example a laser diode, to generate the aimer beam.

At 610, at least one processor of the machine-readable symbol reader can process the images or image information acquired or generated by the event-based image sensor, the processing including, for example, determining a characteristic of the aimer pointer and optionally determining a position or location of the aimer pointer in the frame. Determining a characteristic of the aimer pointer can include, for example, determining a size of at least one characteristic dimension (e.g., diameter, perimeter, area, diagonal, length of major axis, length of minor axis, ratio of length of major axis to length of minor axis, diagonal axis) of the aimer pointer (e.g., aimer illumination spot, aimer laser spot) and/or determining an edge sharpness of the aimer pointer (e.g., aimer illumination spot, aimer laser spot).

The method 600 enters a first iterative loop 612, comprising acts 614, 616, and 618.

At 614, at least one processor of the machine-readable symbol reader can adjust the optics (e.g., one or more lenses) to focus at a next one of the focus positions or focus position steps in a first direction of focus (e.g., toward near focus, or toward far focus).

At 616, at least one processor of the machine-readable symbol reader determines or otherwise detects if there is a variation in the aimer pointer (e.g., aimer illumination spot, aimer laser spot). For example, the at least one processor can determine whether a size of a characteristic dimension (e.g., diameter, perimeter, area, diagonal, length of major axis, length of minor axis, ratio of length of major axis to length of minor axis, diagonal axis) of the aimer pointer (e.g., aimer illumination spot, aimer laser spot) has changed or varied (e.g., growing or getting larger, shrinking or getting smaller). Also for example, the at least one processor can determine whether an edge sharpness of the aimer pointer (e.g., aimer illumination spot, aimer laser spot) has changed or varied (e.g., edge sharpness increased or improved, edge sharpness decreased or deteriorated).

At 618, at least one processor of the machine-readable symbol reader determines whether the characteristic dimension (e.g., diameter, perimeter, area, diagonal, length of major axis, length of minor axis, ratio of length of major axis to length of minor axis, diagonal axis) of the aimer pointer (e.g., aimer illumination spot, aimer laser spot) is shrinking or getting smaller and/or whether the edge sharpness is increasing or improving. In response to determining that the aimer pointer is shrinking or getting smaller and/or the edge sharpness is increasing or improving (YES), control returns to 614 to sweep through focal position steps toward the first direction of focus. In response to determining that the aimer pointer is not shrinking or getting smaller and/or the edge sharpness is not increasing or improving (NO), control passes to enter a second iterative loop 620.

The second iterative loop 620 comprises acts 622, 624, and 626.

At 622, at least one processor of the machine-readable symbol reader can adjust the optics (e.g., one or more lenses) to focus at a next one of the focus positions or focus position steps in a second direction of focus (e.g., toward far focus, or toward near focus), the second direction of focus opposite the first direction of focus.

At 624, at least one processor of the machine-readable symbol reader determines or otherwise detects if there is a variation in the aimer pointer (e.g., aimer illumination spot, aimer laser spot). For example, the at least one processor can determine whether a size of a characteristic dimension (e.g., diameter, perimeter, area, diagonal, length of major axis, length of minor axis, ratio of length of major axis to length of minor axis, diagonal axis) of the aimer pointer (e.g., aimer illumination spot, aimer laser spot) has changed or varied (e.g., growing or getting larger, shrinking or getting smaller). Also for example, the at least one processor can determine whether an edge sharpness of the aimer pointer (e.g., aimer illumination spot, aimer laser spot) has changed or varied (e.g., edge sharpness increased or improved, edge sharpness decreased or deteriorated).

At 626, at least one processor of the machine-readable symbol reader determines whether the characteristic dimension (e.g., diameter, perimeter, area, diagonal, length of major axis, length of minor axis, ratio of length of major axis to length of minor axis, diagonal axis) of the aimer pointer (e.g., aimer illumination spot, aimer laser spot) is shrinking or getting smaller and/or whether the edge sharpness is increasing or improving. In response to determining that the aimer pointer is shrinking or getting smaller and/or the edge sharpness is increasing or improving (YES), control returns to 622 to sweep through focal position steps toward the second direction of focus (e.g., toward far focus, or toward near focus), the second direction of focus opposite the first direction of focus. In response to determining that the aimer pointer is not shrinking or getting smaller and/or the edge sharpness is not increasing or improving (NO), control passes to 628.

Optionally, at 628, a focus of the optics is adjusted based on an optimized focal position determined via the passive autofocusing, if not already set to the optimized focal position.

At 630, at least one processor of the machine-readable symbol reader can set the image sensor configuration (exposure, gain, windowing) to acquire the images for decoding.

Optionally at 632, at least one processor of the machine-readable symbol reader can optionally turn ON one or more genera illumination sources (e.g., flood illumination) to illuminate the environment within the FOV of the machine-readable symbol reader.

Optionally at 634, the image sensor acquires images using the set image sensor configuration and the optimized focal position. The image can, for instance, represent one or more machine-readable symbols in the field of view of the machine-readable symbol.

Optionally at 636, at least one processor decodes the machine-readable symbols represented in the captured images. Conventional machine-readable symbol decoding techniques can be employed.

The method 600 can terminate at 638, for example until invoked again. Alternatively, the method 600 can repeat continually. In some implementations, the method 600 can be executed by multiple threads, for example via a multi-threaded processor. In at least some implementations where the machine-readable symbol reader includes both shutter image sensor(s) (aka, shutter camera) and event-based image sensor(s) (aka event-based cameras), the acts 628 through 636 can be implemented using image information captured by the shutter image sensor(s).

While the method 600 is illustrated and described as an ordered series of acts or operations, in some implementations the method can omit some acts or operations, include other acts or operations and/or can perform some acts or operations in a different order than illustrated. For example, the choice to start from the near focus is just one option, also the opposite option can be performed, starting from far focus instead of near focus. Thus, in some implementations the direction of focus can be reversed from that described in method 600, for moving in the direction of far focus, then in the direction of near focus. In some implementations, the passive autofocus sequence of the method 600 can restart, for instance on the occurrence of a timeout, and end condition, or if the scene changes or a scene brightness changes beyond a set brightness change threshold.

FIGS. 7A-7F show some example image information representations of fields of view generated by an event-based image sensor in operation according to the method 600 (FIGS. 6A and 6B). As noted, the event-based image sensor typically outputs data comprising or specifying the coordinates of pixels with a change in incident light intensity. Thus, the image information can indicate pixels with increasing intensity values having a first value (e.g., Boolean value 0) and pixels with decreasing intensity values with a second value (e.g., Boolean value 1), the output omitting pixels with a consistent intensity value. In at least some implementations, the event-based image sensor can have specific thresholds to determine whether an increase and/or decrease in intensity is sufficient to trigger an output. Such image information can be reconstructed as two-dimensional (2D) representations or digital images. In these examples, a first gray scale value indicates no activity for the respective pixels, a second gray scale value indicates a brightness increase for the respective pixels, and a third gray scale value indicates a brightness decrease for the respective pixels. From FIGS. 7A-7F, it can be seen that aimer pointer (e.g., laser aimer spot) localization and tracking are very easy to process and also changes in a size of a characteristics dimension (e.g., aimer spot diameter) of the aimer pointer is easily detectable.

Figure 7A:
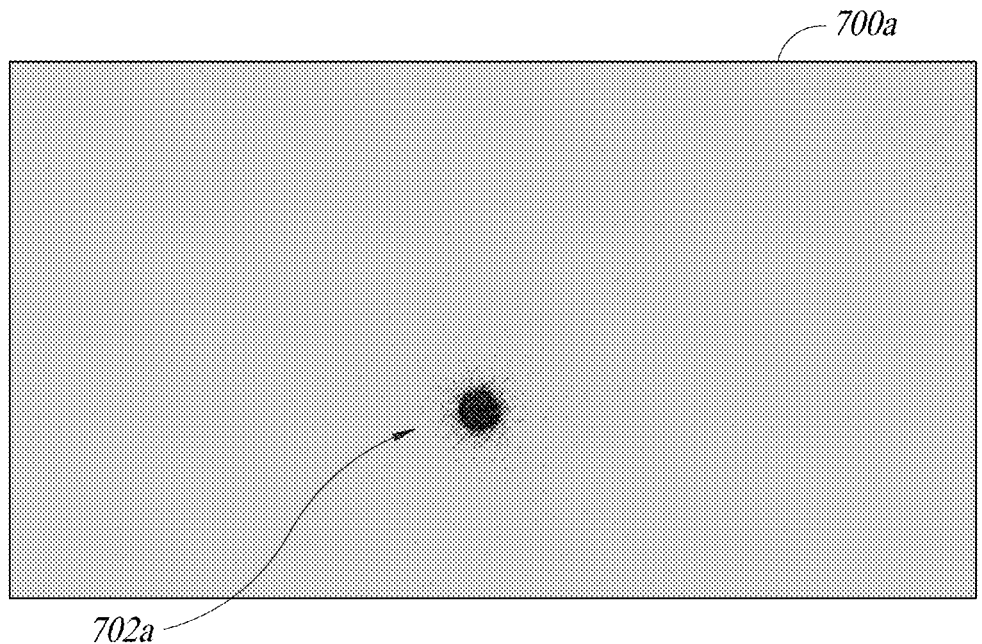
FIG. 7A is a graphical representation of an image information representation of a field of view generated by an event-base image sensor of an image acquisition system including an aimer pointer in the form of a laser spot produced on a target object by an illumination source (e.g., laser) of an aimer subsystem, for instance an aimer subsystem of a machine-readable symbol reader, according to one illustrated implementation.

In particular, FIG. 7A shows a graphical representation of an image information representation of a field of view 700*a* generated by an event-base image sensor, the field of view 700*a* encompassing an aimer pointer in the form of a laser spot 702*a* produced on a target object 704 by an illumination source (e.g., laser) of an aimer subsystem, for instance an aimer subsystem of a machine-readable symbol reader, according to one illustrated implementation.

Figure 7B:
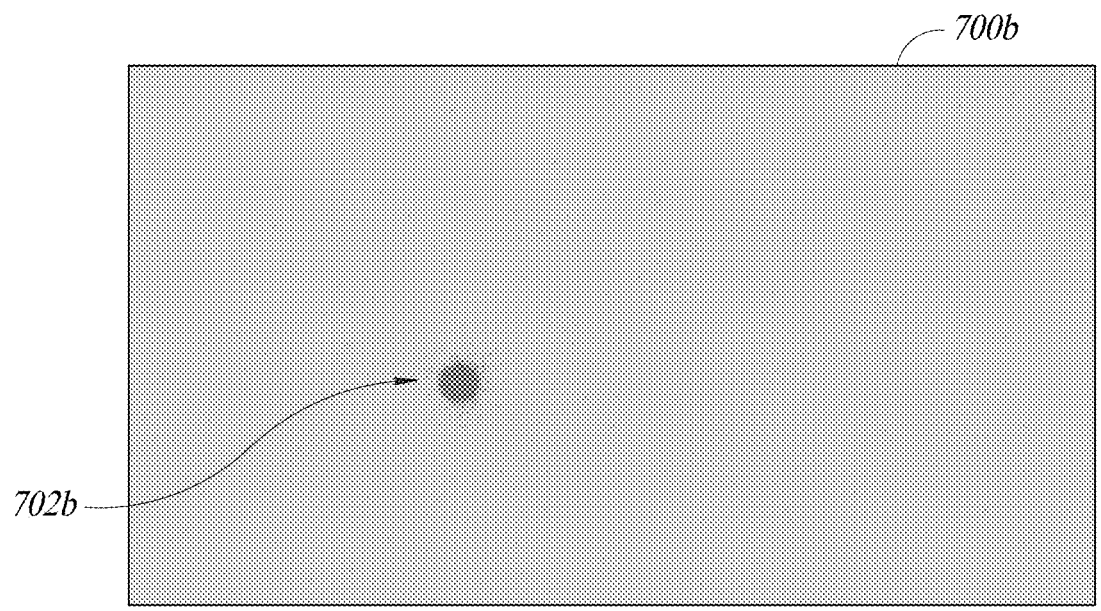
FIG. 7B is a graphical representation of an image information representation of a field of view generated by an event-base image sensor of the image acquisition system but with the laser spot turned OFF, the illumination source of the aimer subsystem being in an OFF state, according to one illustrated implementation.

FIG. 7B shows a graphical representation of an image information representation of a field of view 700*b* generated by the event-base image sensor but with the aimer pointer in the form of a laser spot 702*b* being turned from ON to OFF relative to FIG. 7A, the illumination source of the aimer subsystem being switched into an OFF state, according to one illustrated implementation. The switching OFF illustrates a decreasing in intensity value for pixels that represent the aimer pointer relative to that of FIG. 7A and hence an output for the corresponding pixels.

Figure 7C:
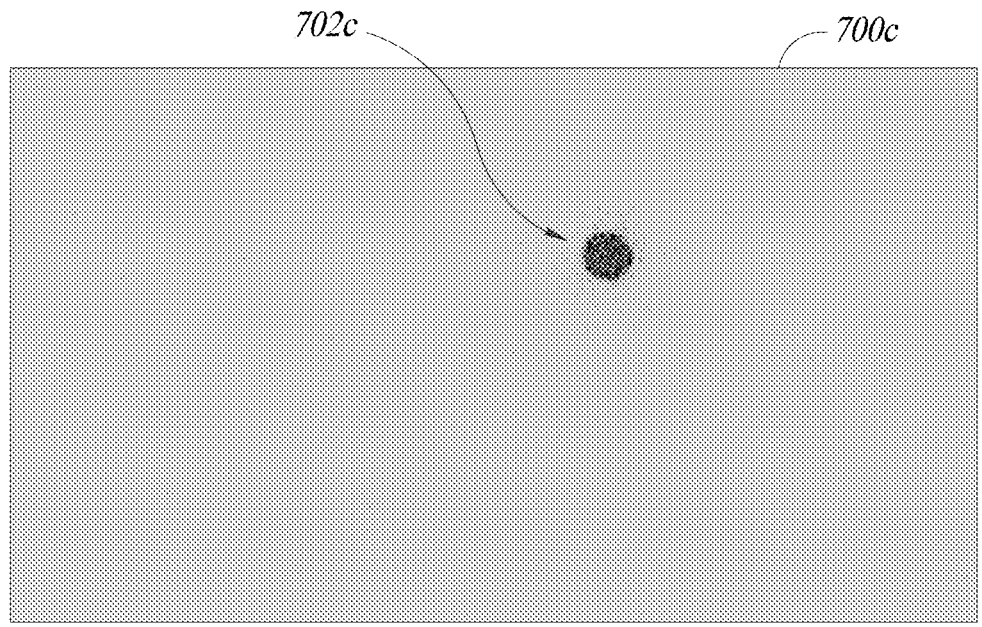
FIG. 7C is a graphical representation of an image information representation of a field of view generated by an event-base image sensor of the image acquisition system including the aimer pointer in the form of the laser spot produced on the target object by the illumination source (e.g., laser) of the aimer subsystem at a first focus, focus point or focus distance, the aiming pointer having a characteristic dimension of a first size, according to one illustrated implementation.

FIG. 7C shows a graphical representation of an image information representation of a field of view 700*c* generated by the event-base image sensor, field of view 700*c* including the aimer pointer in the form of the laser spot 702*c* produced on the target object 704 by the illumination source (e.g., laser) of the aimer subsystem at a first focal distance, the laser spot 702*c* having a characteristic dimension (e.g., diameter, perimeter, area, diagonal, length of major axis, length of minor axis, ratio of length of major axis to length of minor axis, diagonal axis) of a first size, according to one illustrated implementation. The relative change in intensity is indicated by the color of the pixels in the graphical representation, which again can be digitally represented by a Boolean value, or possible a non-Boolean value. Whether focusing is improving nor not is indicated by whether a size of the set of pixels that represent the laser spot 702*c* is decreasing or increasing and/or whether a measure of edge sharpness is increasing or decreasing.

Figure 7D:
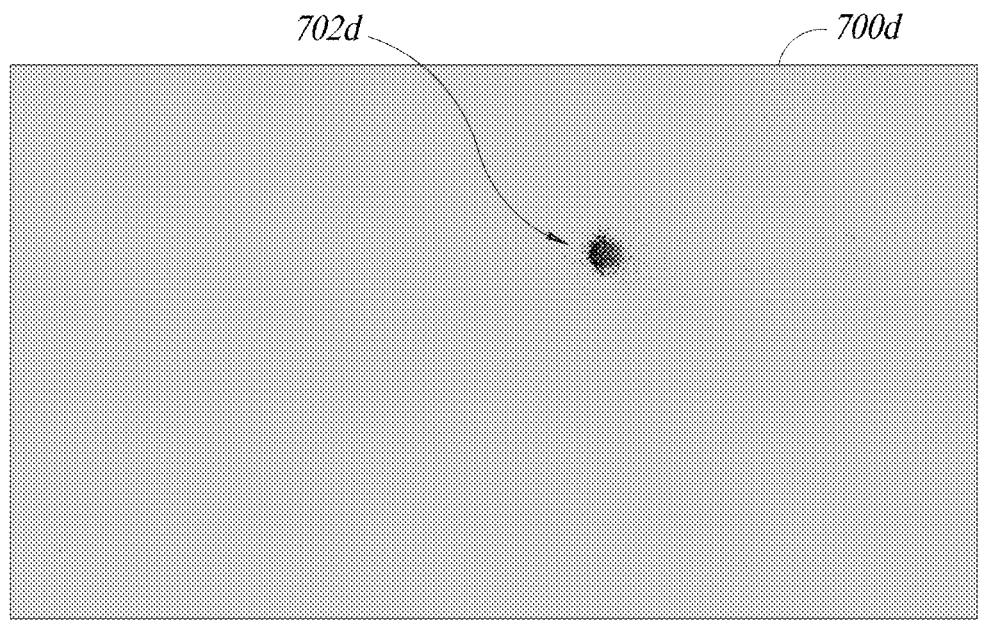
FIG. 7D is a graphical representation of an image information representation of a field of view generated by an event-base image sensor of the image acquisition system including the aimer pointer in the form of the laser spot produced on the target object by the illumination source (e.g., laser) of the aimer subsystem at a second focus, focus point or focus distance, the aiming pointer having the characteristic dimension of a second size, the second size smaller than the first size, according to one illustrated implementation.

FIG. 7D shows a graphical representation of an image information representation of a field of view 700*d* generated by the event-base image sensor, field of view 700*d* including the aimer pointer in the form of the laser spot 702*d* produced on the target object 704 by the illumination source (e.g., laser) of the aimer subsystem at a second focal distance, the laser spot 702*d* having the characteristic dimension (e.g., diameter, perimeter, area, diagonal, length of major axis, length of minor axis, ratio of length of major axis to length of minor axis, diagonal axis) of a second size, the second size smaller than the first size, according to one illustrated implementation. The relative change in intensity is indicated by the color of the pixels in the graphical representation, which again can be digitally represented by a Boolean value, or possible a non-Boolean value. Whether focusing is improving nor not is indicated by whether a size of the set of pixels that represent the laser spot 702*d* is decreasing or increasing and/or whether a measure of edge sharpness is increasing or decreasing.

Figure 7E:
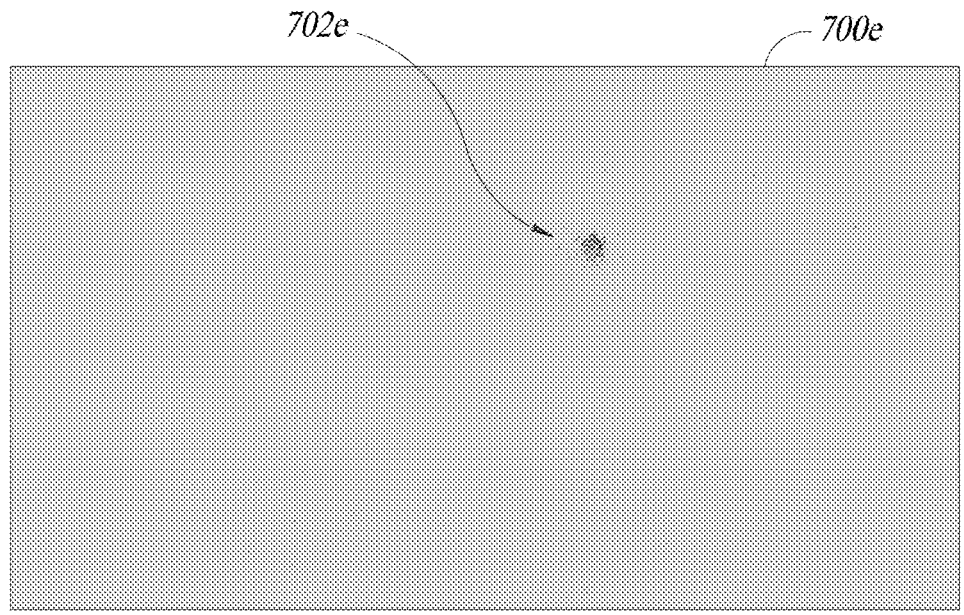
FIG. 7E is a graphical representation of an image information representation of a field of view generated by an event-base image sensor of the image acquisition system including the aimer pointer in the form of the laser spot produced on the target object by the illumination source (e.g., laser) of the aimer subsystem at a third focus, focus point or focus distance, the aiming pointer having the characteristic dimension of a third size, the third size smaller than the second size, according to one illustrated implementation.

FIG. 7E shows a graphical representation of an image information representation of a field of view 700*e* generated by the event-base image sensor, field of view 700*e* including the aimer pointer in the form of the laser spot 702*e* produced on the target object 704 by the illumination source (e.g., laser) of the aimer subsystem at a third focal distance, the laser spot 702*e* having the characteristic dimension (e.g., diameter, perimeter, area, diagonal, length of major axis, length of minor axis, ratio of length of major axis to length of minor axis, diagonal axis) of a third size, the third size smaller than the second size, according to one illustrated implementation. The relative change in intensity is indicated by the color of the pixels in the graphical representation, which again can be digitally represented by a Boolean value, or possible a non-Boolean value. Whether focusing is improving nor not is indicated by whether a size of the set of pixels that represent the laser spot 702*e* is decreasing or increasing and/or whether a measure of edge sharpness is increasing or decreasing.

A similar approach to the method 600 (FIGS. 6A and 6B) and/or even the method 500 (FIG. 5) can be used not only with event-based image sensor, but also when using image sensors and image processing systems that can generate an output similar to an event-based image sensor.

Figure 8:
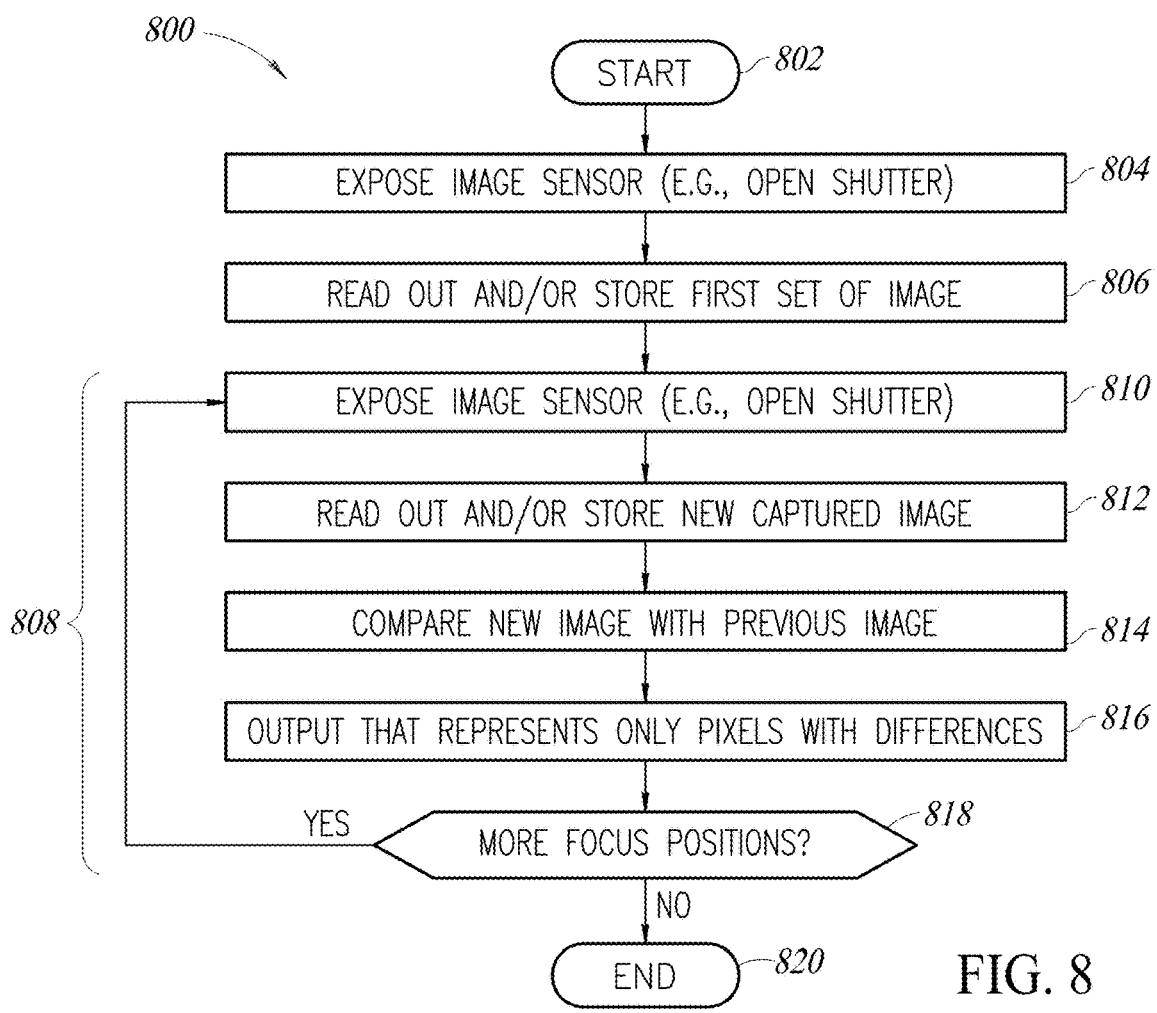
FIG. 8 is a flow diagram of a method of operation for a machine-readable symbol reader with a shutter image sensor to capture successive images of a machine-readable symbol on a target object, compare pairs of images, and output difference data similar to the output of an event-based image sensor, according to one illustrated implementation.

For example, a system with a more conventional global shutter sensor can be combined with an image processing system that outputs only the pixels that have a change in value, mimicking the event-based image sensor. In this case, the responsiveness or "snappiness" of the passive autofocusing will be limited by the sensor frame rate, but nevertheless the advantages of efficient processing and computational speed is maintained. A method of implementing such is described with reference to FIG. 8, below FIG. 8 shows a method 800 of operation of an image acquisition system described in terms of a machine-readable symbol reader that can be used to implement passive autofocusing, according to one illustrated implementation. The method 800 may be executed by an image acquisition system, for example a machine-readable symbol reader such as the machine-readable symbol readers 100, 200 of FIGS. 1 and 2, and may in particular employ a shutter image sensor, for example the global or rolling shutter image sensor 300*a* (FIG. 3A). The system 800 can, for example, be employed with some or all of the acts or operations of the method 500 (FIG. 5).

As previously discussed, the machine-readable symbol reader may include an aimer subsystem operable to project an aimer beam outward of the machine-readable symbol reader to produce an aimer pointer, optics that have an adjustable focus, at least one image sensor with a field of view that extends via the optics outward of the machine-readable symbol reader and which is operable to capture images or image information that appear in the FOV including the aimer pointer and machine-readable symbols. The machine-readable symbol reader may further include at least one processor that performs passive autofocus, configures the machine-readable symbol reader to capture image information from machine-readable symbols appearing in the field of view and optionally decodes the captured machine-readable symbols.

The method 800 starts at 802, for example, when a user picks up a machine-readable symbol reader to scan a machine-readable symbol (e.g., 1D or 2D barcode, alphanumeric characters) placed on a target object or item (e.g., clothing, packaging, circuit board), or when a trigger is actuated, or when a target object or item is otherwise presented to the machine-readable symbol reader.

At 804, at least one processor of the machine-readable symbol reader causes the image sensor to be exposed, for example by opening and then closing a shutter or by sampling or reading out all of the pixels or subsets of the pixels of the image sensor.

At 806, at least one processor of the machine-readable symbol reader causes a first set of image information (e.g., first image) captured by the image sensor to be read out and/or stored to one or more nontransient storage media (e.g., memory, for instance random access memory (RAM)).

The method 800 then enters an iterative loop 808 to capture and process pairs of images. The iterative loop includes four acts or operations: 810, 812, 814 and 816, described below. The iterative loop 808 can repeat until sufficient images have been captured, for example images at each focus position or focus position step.

At 810, at least one processor of the machine-readable symbol reader subsequently again causes the image sensor to be exposed, for example by opening and then closing a shutter or by sampling or reading out all of the pixels or subsets of the pixels of the image sensor.

At 812, at least one processor of the machine-readable symbol reader causes a second set of image information (e.g., new or next image) captured by the image sensor to be read out and/or stored to one or more nontransient storage media (e.g., memory, for instance random access memory (RAM)).

At 814, at least one processor of the machine-readable symbol reader causes a comparison of the set of image information for the new or next image with the set of image information for the previous image, identifying differences (e.g., pixels with intensity level changes in the set of image information for the new or next image as compared to the set of image information for the previous image).

At 816, at least one processor of the machine-readable symbol reader causes an output that represents only those pixels with differences or changes (e.g., pixels with intensity level changes in the set of image information for the new or next image as compared to the set of image information for the previous image). The at least one processor can employ a specified threshold for determining whether a change in intensity or illumination level is sufficient to constitute a difference.

At 818, the at least one processor determines whether all focus positions or focus positions steps have been processed.

If all focus positions or focus positions steps have not been processed, control can then return to 810 to capture a next image and compare such to the most previously captured image. If all focus positions or focus positions steps have been processed, control can pass to 820.

The method 800 can terminate at 820, for example until invoked again. Alternatively, the method 800 can repeat continually. In some implementations, the method 800 can be executed by multiple threads, for example via a multi-threaded processor.

While the method 800 is illustrated and described as an ordered series of acts or operations, in some implementations the method can omit some acts or operations, include other acts or operations and/or can perform some acts or operations in a different order than illustrated.

Figure 9A:
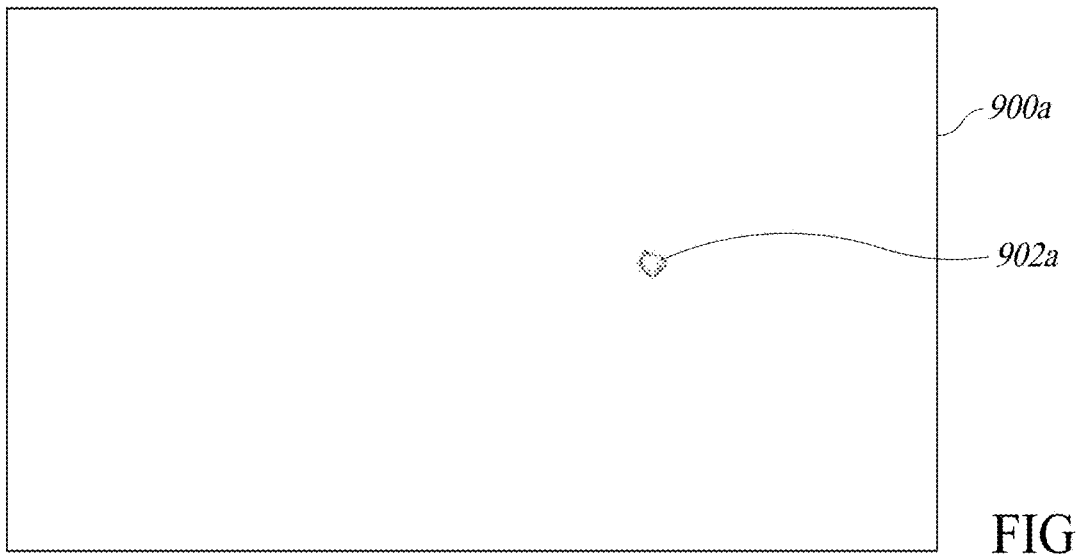
FIG. 9A is a graphic representation a reconstructed image of a field of view of an image acquisition system including an aimer pointer in the form of a laser spot produced on a target object by an illumination source (e.g., laser) of an aimer subsystem captured at two different times, showing only pixels with changes of intensity to represent a change in a characteristic dimension of the laser spot from a first size at a first time to a second size at a second time successively following the first time, according to one illustrated implementation.
Figure 9B:
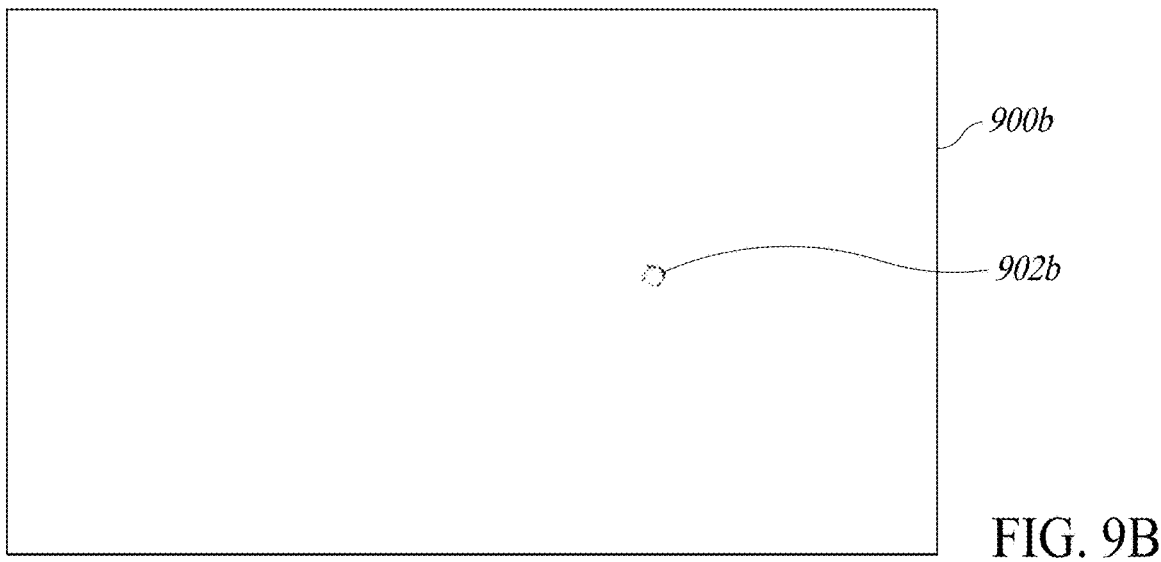
FIG. 9B is a graphic representation a reconstructed image of a field of view of an image acquisition system including an aimer pointer in the form of a laser spot produced on a target object by an illumination source (e.g., laser) of an aimer subsystem captured at two different times, showing only pixels with changes of intensity to represent a change in a characteristic dimension of the laser spot from the second size at the second time to a third size at third time successively following the second time, according to one illustrated implementation.
Figure 9C:
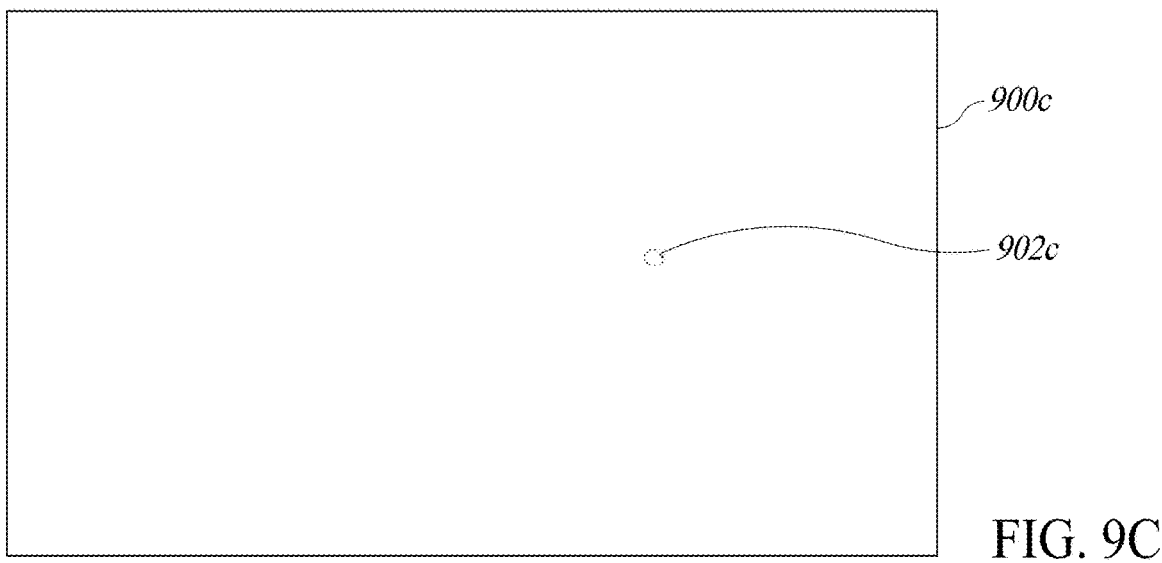
FIG. 9C is a graphic representation a reconstructed image of a field of view of an image acquisition system including an aimer pointer in the form of a laser spot produced on a target object by an illumination source (e.g., laser) of an aimer subsystem captured at two different times, showing only pixels with changes of intensity to represent a change in a characteristic dimension of the laser spot from the third size at the third time to a fourth size at fourth time successively following the third time, according to one illustrated implementation.

FIGS. 9A, 9B, and 9C show reconstructed images 900a, 900b, 900c, respectively, that result from a difference computation such as described with respect to method 800 (FIG. 8), where the output includes only the pixels and/or coordinates of those pixels with a difference in intensity or brightness or alternatively with a difference in intensity or brightness that exceeds a specified threshold of change. In a more classic approach, the output can constitute an image or image information that is a difference of two successive images. As is visible from FIGS. 9A, 9B, and 9C, a size of a characteristic dimension (e.g., perimeter) of the aimer pointer (e.g., aimer laser spot) 902, 902c, 902c, respectively, grows smaller from FIG. 9A to FIG. 9B, and from FIG. 9B to FIG. 9C, and an edge thereof becomes thinner when as the image sensor approaches an optimal or at least optimized focus. When moving out of focus the effect is the opposite, and easily discernable using image processing techniques.

The various implementations described above can be combined to provide further implementations. All of the commonly assigned US patent application publications, US patent applications, foreign patents, and foreign patent applications referred to in this specification and/or listed in the Application Data Sheet are incorporated herein by reference, in their entirety, including but not limited to: U.S. patent application Ser. No. 17/118,374, published as US-2022-0187459-A1; U.S. Pat. No. 9,800,749 B1; and U.S. patent application Ser. No. 17/534,797, published as US-2022-0207353-A1.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof, any of which may be referred to herein as one or more processors. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computer systems, microcontrollers, microprocessors, digital signal processors, graphics processing units, as firmware, or as virtually any combination thereof, and that designing the circuitry and/or writing the code for the software and or firmware to implement one or more processors or controllers would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

We claim:

1. A method of operation of an image acquisition system, the image acquisition system having an aimer subsystem, at least one image sensor, and at least one optic, the method comprising:
   emitting an aimer beam, by the aimer subsystem, outward of the image acquisition system to produce an aimer pointer in a field of view of the image acquisition system;
   for each of a plurality of focus settings,
      adjusting a focal point of the at least one optic according to a current one of the focus settings of the plurality of focus settings; and
      capturing, via the at least one image sensor, image information representative of one or more characteristics of the aimer pointer returned to the image acquisition system; and
      determining, via at least one processor, at least one of the one or more characteristics of the aimer pointer at the current one of the focus settings of the plurality of focus settings;
   identifying the one of the plurality of focus settings that results in an optimized focus of the aimer pointer based at least in part on the determined at least one of the one or more characteristics of the aimer pointer; and
   configuring the image acquisition system based on the identified one of the plurality of focus settings that results in the optimized focus of the aimer pointer to at least one of: capture images and process the captured images by the at least one processor,
   wherein the image acquisition system comprises a global shutter image sensor and an event-based image sensor, and further comprising: using image information captured by the event-based image sensor for the identifying the one of the plurality of focus settings that results in an optimized focus of the aimer pointer and using image information captured by the global shutter image sensor to regulate a focus based on the identified one of the plurality of focus settings that results in the optimized focus of the aimer pointer, in order to acquire images for decoding.

2. The method of claim 1 wherein the capturing image information representative of one or more characteristics of the aimer pointer is performed at a plurality of the focus settings before the identifying the one of the plurality of focus settings that results in the optimized focus of the aimer pointer.

3. The method of claim 1 wherein adjusting a setting of at least one optic according to a current one of the focus settings for each of a plurality of focus settings includes:
iteratively,
adjusting the focal point of the at least one optic to focus at a next one of the plurality of focus settings in a first direction of focus;
determining whether at least one dimension of the aimer pointer is decreasing or increasing; and
while the at least one dimension of the aimer pointer is determined to be decreasing, adjusting the focal point of the at least one optic according to a next one of the plurality of focus settings in the first direction of focus for the at least one optic;
iteratively,
determining whether at least one dimension of the aimer pointer is decreasing or increasing;
while the at least one dimension of the aimer pointer is determined to be increasing, adjusting the focal point of the at least one optic according to a next one of the plurality of focus settings in a second direction of focus for the at least one optic, the second direction of focus opposite the first direction of focus;
iteratively,
determining whether at least one dimension of the aimer pointer is decreasing or increasing;
while the at least one dimension of the aimer pointer is determined to be decreasing, continue adjusting the focal point of the at least one optic according to a next one of the plurality of focus settings in the second direction of focus of the at least one optic;
determining whether at least one dimension of the aimer pointer is decreasing or increasing; and
in response to determining that at least one dimension of the aimer pointer is not decreasing, stop adjusting to a next one of the plurality of focus settings.

4. The method of claim 3 further comprising determining, via the event-based sensor, whether at least one dimension of the aimer pointer is decreasing or increasing includes determining whether a characteristic dimension of the aimer pointer is decreasing or increasing based on an output of an event camera.

5. The method of claim 1 wherein adjusting a setting of at least one optic according to a current one of the focus settings for each of a plurality of focus settings includes:
iteratively,
adjusts the focal point of the at least one optic to focus at a next one of the plurality of focus settings in a first direction of focus;
determining whether an edge sharpness of the aimer pointer is decreasing or increasing; and
while the edge sharpness of the aimer pointer is determined to be increasing, adjusting the focal point of the at least one optic according to a next one of the plurality of focus settings in a first direction of focus for the at least one optic;
iteratively,
determining whether the edge sharpness of the aimer pointer is decreasing or increasing;
while the edge sharpness of the aimer pointer is determined to be decreasing adjusting the focal point of the at least one optic according to a next one of the plurality of focus settings in a second direction of focus for the at least one optic, the second direction of focus opposite the first direction of focus;
iteratively,
determining whether the edge sharpness of the aimer pointer is decreasing or increasing;
while the edge sharpness of the aimer pointer is determined to be increasing, continue adjusting the focal point of the at least one optic according to a next one of the plurality of focus settings in the second direction of focus of the at least one optic;
determining whether the edge sharpness of the aimer pointer is decreasing or increasing; and
in response to determining that the edge sharpness of the aimer pointer is not increasing, stop adjusting to a next one of the plurality of focus settings.

6. The method of claim 1 wherein emitting an aimer beam outward of the image acquisition system to produce an aimer pointer in a field of view of the image acquisition system includes emitting a laser or LED aimer beam outward of the image acquisition system to produce at least one of a laser spot aimer pointer or a laser two-dimensional pattern aimer pointer or LED spot aimer pointer or LED two-dimensional pattern aimer pointer in the field of view of the image acquisition system.

7. The method of claim 1, further comprising:
determining the plurality of focus settings before adjusting the focal point of the at least one optic.

8. The method of claim 1 further comprising:
processing each of a plurality of captured images of the aimer pointer at respective ones of the plurality of focus settings to determine a respective one or more characteristics of the aimer pointer in each of the captured images; and wherein the identifying the one of the plurality of focus settings that results in an optimized focus of the aimer pointer is based at least in part on comparing the determined one or more characteristics of the aimer pointer in the respective captured images.

9. The method of claim 2 wherein the plurality of focus settings including moving a focus position in a direction of focus.

10. The method of claim 9 wherein the direction of focus includes starting at a near focus setting and moving toward a far focus setting.

11. The method of claim 9 wherein the direction of focus includes starting at a far focus setting and moving toward a near focus setting.

12. The method of claim 1 further comprising determining a position of the aimer pointer within a frame of the event-based sensor.

13. The method of claim 1 wherein determining whether at least one dimension of the aimer pointer is decreasing or increasing is performed by the event-based sensor.

14. The method of claim 1 further comprising decoding one or more machine-readable symbols represented in the images by the global shutter image sensor.

15. The method of claim 3 wherein determining whether at least one dimension of the aimer pointer is decreasing or increasing includes determining whether a size of the aimer pointer is shrinking or growing based on data from the event-based sensor.

16. An image acquisition system, comprising:
an aimer subsystem operable to emit an aimer beam outward of the image acquisition system to produce an aimer pointer in a field of view of the image acquisition system,
at least one image sensor that captures image information representative of one or more characteristics of the aimer pointer returned to the image acquisition system and image information representative of targets in the field of view of the image acquisition system,
at least one optic; and
a control system comprising at least one processor, the control system operable to:
for each of a plurality of focus settings,
adjust a focal point of the at least one optic according to a current one of the focus settings of the plurality of focus settings; and
determine at least one of the one or more characteristics of the aimer pointer at the current one of the focus settings of the plurality of focus settings;
identify the one of the plurality of focus settings that results in an optimized focus of the aimer pointer based at least in part on the determined at least one of the one or more characteristics of the aimer pointer; and
configure the image acquisition system based on the identified one of the plurality of focus settings that results in the optimized focus of the aimer pointer to at least one of: capture images and process the captured images by the at least one processor,
wherein the at least one image sensor comprises a global shutter image sensor and an event-based image sensor, and the at least one processor further:
uses image information captured by the event-based image sensor to identify the one of the plurality of focus settings that results in an optimized focus of the aimer pointer and uses image information acquired by the global shutter image sensor to regulate a focus based on the identified one of the plurality of focus settings that results in the optimized focus of the aimer pointer, in order to acquire images for decoding.

17. The image acquisition system of claim 16 wherein to adjust a setting of at least one optic according to a current one of the focus settings for each of a plurality of focus settings the at least one processor:
iteratively,
adjusts the focal point of the at least one optic to focus at a next one of the plurality of focus settings in a first direction of focus;
determines whether at least one dimension of the aimer pointer is decreasing or increasing; and
while the at least one dimension of the aimer pointer is determined to be decreasing, adjusts the focal point of the at least one optic according to a next one of the plurality of focus settings in the first direction of focus for the at least one optic;
iteratively,
determine whether at least one dimension of the aimer pointer is decreasing or increasing;
while the at least one dimension of the aimer pointer is determined to be increasing, adjust the focal point of the at least one optic according to a next one of the plurality of focus settings in a second direction of focus for the at least one optic, the second direction of focus opposite the first direction of focus;
iteratively,
determine whether at least one dimension of the aimer pointer is decreasing or increasing;
while the at least one dimension of the aimer pointer is determined to be decreasing, continue to adjust the focal point of the at least one optic according to a next one of the plurality of focus settings in the second direction of focus of the at least one optic;
determines whether at least one dimension of the aimer pointer is decreasing or increasing;
in response to a determination that at least one dimension of the aimer pointer is not decreasing, stop any adjustment to a next one of the plurality of focus settings.

18. The image acquisition system of claim 17 wherein the event-based sensor is configured to determine whether at least one dimension of the aimer pointer is decreasing or increasing the at least one processor determines whether a characteristic dimension of the aimer pointer is decreasing or increasing based on an output of the event-based sensor.

19. The image acquisition system of claim 18 wherein the characteristic dimension of the aimer pointer is at least one of a diameter, perimeter, area, diagonal, length of a major axis, length of a minor axis, ratio of the length of a major axis and the length of a minor axis, or a diagonal axis.

20. The image acquisition system of claim 16 wherein to adjust a setting of at least one optic according to a current one of the focus settings for each of a plurality of focus settings the at least one processor:
iteratively,
adjusts the focal point of the at least one optic to focus at a next one of the plurality of focus settings in a first direction of focus;
determines whether an edge sharpness of the aimer pointer is decreasing or increasing; and
while the edge sharpness of the aimer pointer is determined to be increasing, adjusts the focal point of the at least one optic according to a next one of the plurality of focus settings in a first direction of focus for the at least one optic;
iteratively,
determine whether the edge sharpness of the aimer pointer is decreasing or increasing;
while the edge sharpness of the aimer pointer is determined to be decreasing adjust the focal point of the at least one optic according to a next one of the plurality of focus settings in a second direction of focus for the at least one optic, the second direction of focus opposite the first direction of focus;
iteratively,
determine whether the edge sharpness of the aimer pointer is decreasing or increasing;
while the edge sharpness of the aimer pointer is determined to be increasing, continue to adjust the focal point of the at least one optic according to a next one of the plurality of focus settings in the second direction of focus of the at least one optic;
determines whether the edge sharpness of the aimer pointer is decreasing or increasing;
in response to a determination that the edge sharpness of the aimer pointer is not increasing, stop any adjustment to a next one of the plurality of focus settings.

* * * * *